(12) United States Patent
Pickens et al.

(10) Patent No.: US 9,539,581 B2
(45) Date of Patent: Jan. 10, 2017

(54) METHOD FOR RECYCLING ASH

(71) Applicant: MATERIALS RECOVERY COMPANY, Troy, NY (US)

(72) Inventors: John W. Pickens, Strongsville, OH (US); James H. Riccardi

(73) Assignee: Materials Recovery Company, Cohoes, NY (US)

( * ) Notice: Subject to any disclaimer, the term of this patent is extended or adjusted under 35 U.S.C. 154(b) by 983 days.

(21) Appl. No.: 13/649,831

(22) Filed: Oct. 11, 2012

(65) Prior Publication Data

US 2013/0181075 A1    Jul. 18, 2013

Related U.S. Application Data

(60) Provisional application No. 61/545,712, filed on Oct. 11, 2011.

(51) Int. Cl.
*B02C 23/14* (2006.01)
*B02C 23/10* (2006.01)
*B03B 9/04* (2006.01)
*C22B 7/02* (2006.01)

(52) U.S. Cl.
CPC .............. *B02C 23/14* (2013.01); *B02C 23/10* (2013.01); *B03B 9/04* (2013.01); *C22B 7/02* (2013.01); *Y02P 10/212* (2015.11)

(58) Field of Classification Search
CPC ............ C22B 7/02; B02C 23/10; B02C 23/14; B03B 9/04
USPC ........ 241/22, 23, 24.14, 24.25, 29, 79, 79.1; 209/734
See application file for complete search history.

(56) References Cited

U.S. PATENT DOCUMENTS

| | | | | |
|---|---|---|---|---|
| 3,905,556 A | * | 9/1975 | Drage | B02C 23/14 209/44 |
| 4,044,956 A | * | 8/1977 | Benedetto | B03B 9/04 241/20 |
| 4,465,596 A | | 8/1984 | Soyez | |
| 5,067,659 A | * | 11/1991 | Heeren | B02C 13/28 241/19 |
| 5,143,304 A | * | 9/1992 | Schwyter | B03B 9/04 110/346 |

(Continued)

FOREIGN PATENT DOCUMENTS

| | | | | |
|---|---|---|---|---|
| CA | 2720279 A1 | 10/2009 | | |
| CN | 2220900 Y | * 2/1996 | | B03C 1/10 |

(Continued)

OTHER PUBLICATIONS

Translation for CN 2220900.*

(Continued)

*Primary Examiner* — Faye Francis
*Assistant Examiner* — Onekki Jolly
(74) *Attorney, Agent, or Firm* — Heslin Rothenberg Farley & Mesiti P.C.

(57) ABSTRACT

Methods and system for recovering metals from combustion ash containing ferrous and nonferrous metals, including the steps of providing a feedstock source of ash, comminuting the ash to substantially reduce the particle size and liberate metal particles therein, separating the metal particles from the comminuted ash by particle size to obtain ash with a reduced metal content, at least one ferrous product and at least one nonferrous product.

42 Claims, 12 Drawing Sheets

(56) References Cited

U.S. PATENT DOCUMENTS

| | | | | |
|---|---|---|---|---|
| 5,174,509 | A | * | 12/1992 | Starke .................... B03B 9/04 241/24.14 |
| 5,356,082 | A | * | 10/1994 | Prinz ..................... B03B 9/04 241/24.13 |
| 5,373,946 | A | * | 12/1994 | Olivier ................. B03B 11/00 209/172.5 |
| 5,772,726 | A | | 6/1998 | Woods et al. |
| 5,992,776 | A | * | 11/1999 | Arcaini .................. B03B 9/04 241/77 |
| 6,193,941 | B1 | | 2/2001 | Buxel et al. |
| 6,451,086 | B2 | | 9/2002 | Hansmann et al. |
| 2002/0079392 | A1 | * | 6/2002 | Tango .................... B03B 9/00 241/79 |
| 2004/0141891 | A1 | | 7/2004 | Abe et al. |
| 2008/0277351 | A1 | | 11/2008 | Harman et al. |
| 2009/0183543 | A1 | | 7/2009 | Boutoussov |
| 2011/0084005 | A1 | | 4/2011 | Berkhout et al. |
| 2011/0214535 | A1 | | 9/2011 | Vandor |
| 2013/0068628 | A1 | * | 3/2013 | Ling .................... C22B 3/10 205/339 |

FOREIGN PATENT DOCUMENTS

| | | | | |
|---|---|---|---|---|
| DE | 10206834 | A1 | * 8/2002 | ......... B02C 13/1814 |
| EP | 0330872 | A2 | 9/1989 | |
| EP | 0798020 | A1 | 10/1997 | |
| EP | 1039221 | A1 | 9/2000 | |
| MX | 2010010886 | A | 2/2011 | |
| WO | 2006096472 | A1 | 9/2006 | |
| WO | 2011/074948 | A1 | 6/2011 | |

OTHER PUBLICATIONS

Sakano et al., "Application of radio-frequency thermal plasmas to treatment of fly ash", Thin Solid Films 386, Elsevier Science B.V., 189-194 (2001).

Lima et al., "Assessing fly ash treatment: Remediation and stabilization of heavy metals", Journal of Environmental Management xxx, 1-6 (2010).

Hansen et al., "Electrodialytic removal of cadmium from straw combustion fly ash", Journal of chemical Technology and Biotechnology 79:789-794 (online 2004).

Pedersen et al., "Electrodialytic removal of heavy metals from different fly ashes Influence of heavy metal speciation in the ashes", Journal of Hazardous Materials B100 65-78 (2003).

Traina et al., "Electrokinetic remediation of bottom ash from municipal solid waste incinerator", Electronchimica Acta 52, 3380-3385 (2007).

Ramachandran et al., "Electrolytic recovery of zinc from zinc ash using a catalytic anode", Journal of Chemical Technology and Biotechnology 79:578-583 (online 2004).

Geto T., "Method for removing heavy metals from incineration ash and fly ash", Japan Jpn. Kokai Tokkyo Koho JP 10 202,221 [98 202,221] (In Japanese).

Lu et al., "Mineralogy and heavy metal leachability of magnetic fractions separated from some Chinese coal fly ashes", Journal of Hazardous Materials 169 246-255 (2009).

Alorro et al., "Recovery of heavy metals from MSW molten fly ash by carrier-in-pulp method: Fe powder as carrier", Minerals Engineering 21 1094-110 (2008).

Alorro et al., "Recovery of heavy metals from MSW molten fly ash by CIP method", Hydrometallurgy, 97, 8-14 (2009).

Nugteren et al., "Removal of heavy metals from fly ash and the impact on its quality", Journal of Chemical Technology Biotechnology 77:389-395 (online: 2002).

Ottosen et al., "Screening the possibility for removing cadmium and other heavy metals from wastewater sludge and bio-ashes by an electrodialytic method", Electrochimica Acta, 52, 3420-3426 (2007).

Machado et al., "Selective recovery of copper, nickel and zinc from ashes produced from Saccharomyces cerevisiae contaminated biomass used in the treatment of real electroplating effluents", Journal of Hazardous Materials, 184, 357-363 (2010).

Hall et al., "Separation and recovery of materials from scrap printed circuit boards", Resources, Conservation and Recycling, 51, 691-709 (2007).

Takahashi et al., "Technology for recovering phosphorus from incinerated wastewater treatment sludge", Chemosphere, 44, 23-29 (2001).

Finney et al., "The reuse of spent mushroom compost and coal tailings for energy recovery: Comparison of thermal treatment technologies", Bioresource Technology, 100, 310-315 (2009).

* cited by examiner

METHOD FOR RECYCLING ASH

TECHNICAL FIELD

The present invention generally relates to methods and systems for recovering material from municipal solid waste. More particularly, the present invention relates to methods and systems for recovering metals from ash generated by Waste-to-Energy processes and the associated production of a clean ash for use as a recycled mineral sand product.

BACKGROUND INFORMATION

The quantity of municipal waste generated each day creates numerous problems and costs to society. Among these are the huge volume of landfill space consumed each day, the fuel costs and emissions involved in transporting these wastes to the landfill, the ecological liabilities in both air and water emissions associated with burying these wastes, the lack of any energy benefit from most of the green house gas emissions coming from the landfill, the leaching of materials into the waste water coming from the landfills, and the tremendous loss of valuable energy and material resources buried within the landfill.

Some regions and municipalities have created Municipal Recycling Facilities (MRFs), which capture a portion of the material resources from the waste stream, such as glass, metals, plastics, and paper. Others capture little if any of these materials, and in any case, there are very significant material resources that still end up in the landfill solid waste stream.

The application of waste-to-energy (WTE) captures the bulk of the recoverable energy from such waste, and, in the process, reduces the solid waste going to the landfill by around 70-80%; conserving landfill space, reducing landfill-related emissions, and reducing the transportation fuel consumed and its associated cost and emissions. WTE ash generally consists of two types or components of ash, designated as bottom ash and fly ash. The relative portions of bottom ash vs. fly ash depend on the manner of preparation of the municipal solid waste prior to burning and on the manner of burning. By way of example only, bottom ash commonly will constitute around 70-80% of the total WTE ash and fly ash will be around 20-30%. The "bottom ash", i.e. the larger portion of the ash that remains on the "bottom" of the incinerator hearth after combustion, contains the bulk of recoverable metals. Fly ash is made up of the smallest, least massive particles of ash that are carried upward with the exhaust gases produced during incineration. The concentration of heavy metals in fly ash can and often does, make them a hazardous waste because it does not pass leaching toxicity testing (TCLP, Toxicity Characteristic Leaching Procedure).

Some WTE facilities do an additional post-combustion processing of the bottom ash to further remove ferrous and nonferrous metals from the ash prior to disposal. The conventional approach for ash recycling utilizes single-stage magnetic separation to remove iron and steel followed by an eddy current separator to remove some of the remaining nonferrous metals (see, e.g., FIG. 1A). Eddy current separators conventionally could be used to separate metal particles only down to around 0.25 inches, while more modern higher-frequency eddy current separators can separate down to around 0.125 inches but only at a large capital cost per ton of capacity. Therefore, due to limitations of the conventional technologies, current ash recycling approaches miss a substantial amount of metal, particularly the smaller metal particles and non-ferrous materials.

Furthermore, the metal concentrates produced by WTE facilities have relatively low metal concentrations, typically in the range of about 50-70% metal. More specifically, because substantial amounts of remnant ash remain associated with these metal concentrates, the resultant metal concentration (i.e. the quality and value of the metal concentrates) is low. There is also a relatively low level of liberation of the metal from the ash, which has the effect of reducing the percentage of recovery of the metals within the ash stream, particularly for the smaller metal sizes.

Ash has the commercial potential for use in construction material applications (e.g. an aggregate in concrete). In some instances, the chemical composition of the ash can also make it useful as a chemical raw material additive to a process. However, the applicability of WTE ash for use as a product is related to how "clean" the ash is with regard to its chemical composition and the completeness of metal removal. Remnant metals in the ash typically cause a more reactive ash product in which the remnant metal particles can corrode and react with the environment, and leach metals during its life cycle. Such leaching presents potential environmental liabilities and product life/performance liabilities for product applications using the ash. Therefore, when a significant amount of magnetic and nonferrous metals and materials are left behind in the ash, the applicability and appropriateness of such ash for use as a product rather than as a landfill waste is low.

There remains, therefore, a need for an ash recycling method and system for removing and recovering free and combined metals from combustion ash that 1) increases the yield of the recovered metal products and improves the quality of the recovered metal products; and 2) where appropriate, increases the yield of a cleaner ash and improves the properties of the clean ash to produce a superior, higher quality mineral sand product that can be utilized in concrete and other construction materials and other product applications.

The process described herein achieves a high level of liberation of metals and other phases within the ash to enhance the separation and extraction of high quality metal concentrates, and the process technologies for extracting the metal concentrates operate to a fine particle sizes. The amount, size and shape of the metal particles, the quantity of metal particles trapped within or tightly adhered to the ash particles, and likewise the quantity of ash particles trapped within or tightly adhered to metals within the ash, vary widely from ash-to-ash depending upon the composition of the combustion ash and the technology used to create the ash. As described herein, substantial liberation of metal particles from the ash and the use of processes to facilitate extraction and concentration of smaller particles improves metal recovery.

Furthermore, in certain embodiments (by way of example only, when bottom ash is used as an ash source), the process can produce a "clean" ash that is commercially valuable for end-product applications. More specifically, the ash produced has an extremely low remnant metal content which enhances the quality of the ash and its product applicability. The near-absence of any remnant metals in the ash makes the ash less reactive, more stable, less susceptible to corrosive reactions and the associated deleterious effects of corrosion on ash products, and a superior recycled raw material and aggregate for use in ash-based products. The resulting clean ash product is more appropriately referred to as a "mineral sand" or "mineral aggregate".

Thus, the current invention can produce superior quality in the metal end-products, and at times the ash product, plus superior economic value for those products.

SUMMARY OF THE INVENTION

One object of the invention is to provide a method and system for processing combustion ash that produces a high degree of metal recovery from the ash coupled with a high grade concentration of metal products.

Another object is to provide a method and system for recycling combustion ash wherein the ash is recycled either prior to or after being landfilled to recover end products for specific uses.

It is a further object of this invention to provide a method and system for processing ash which, under the right circumstances, can produce a high grade mineral sand product.

To achieve the above objects, the present invention provides, in a first aspect, a method for recovering metals from combustion ash, the steps comprising providing a feedstock source of ash; subjecting the ash to comminution to substantially reduce the particle size of the nonmetal particles contained therein and substantially liberate metal particles entrapped therein, thereby producing comminuted ash, wherein the metal particles comprise relatively ferrous particles and relatively nonferrous particles; processing the comminuted ash with at least one dry separation method based on particle size to obtain a refined ash with a reduced metal content and at least one substantially metal particle stream; separating a portion of the relatively ferrous particles by applying at least one magnetic field to selectively remove magnetic particles and produce at least one ferrous metal product; and separating a portion of the nonmagnetic metal particles to produce at least one metal product with a nonferrous metal content greater than about 70%.

In another aspect, the invention provides a method for recovering metals from combustion ash, the steps comprising providing a feedstock source of ash; subjecting the ash to comminution to reduce the particle size of substantially all of the nonmetal particles contained therein to less than about 2 mm and substantially liberate metal particles entrapped therein, the metal particles comprising relatively ferrous particles and relatively nonferrous particles; separating a portion of the relatively ferrous particles by applying at least one magnetic field to selectively remove magnetic particles and produce at least one ferrous metal product; and performing at least one dry separation method based on particle size to produce at least one metal product with a nonferrous metal content greater than about 70%.

In yet another aspect, the present invention provides a system for recovering metals from combustion ash comprising: at least one comminution mechanism that creates comminuted ash from a feedstock source of ash; at least one classifier mechanism that separates the comminuted ash into at least two streams with specified particle size ranges, said at least two streams comprising at least one substantially metal particle stream and at least one refined ash stream; and a multi-phase magnetic separation system that selectively removes magnetic products from the at least one substantially metal product stream, wherein the multi-phase separation system is tuned for the particle size range of each of the at least one substantially metal product streams and is operated with a progression of higher magnetic field strengths to progressively remove a series of relatively magnetic particles with decreasing ferrous content.

The present invention also provides a method and system for recycling WTE combustion ash, in which ash selected from a group consisting of landfilled ash, combustion ash directly from the WTE plant, pre-processed ash and mixtures thereof is processed to produce highly refined ferrous metal, nonferrous metal and, optionally, mineral sand products using the system for recycling ash. In accordance with the invention, WTE combustion ash would include not only bottom ash, but also combined ash comprising a combination of bottom ash and fly ash, as well as wet and dry ash.

These, and other objects, features and advantages of this invention will become apparent from the following detailed description of the various aspects of the invention taken in conjunction with the accompanying drawings.

DETAILED DESCRIPTION OF THE INVENTION

Figure 1A:
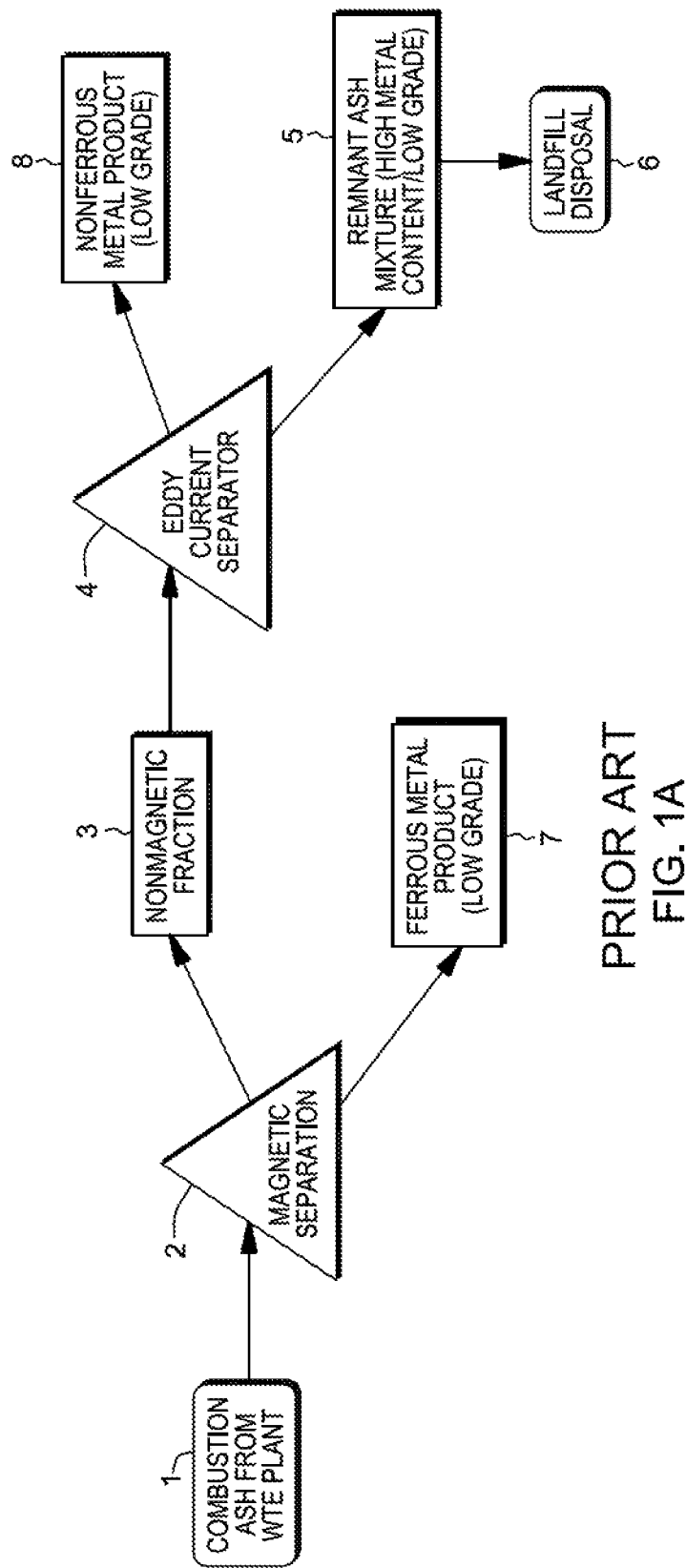
FIG. 1A is a flow diagram of a conventional ash recycling process.

As used herein, "ash" or "combustion ash" will refer generally to the solid product that results from the combustion of solid municipal waste or other source materials that contain ferrous and nonferrous metals.

As used herein, "bottom ash" will refer to any part of the non-combustible residue or particles of post-combustion ash that remain in the combustion chamber during combustion and are subsequently removed therefrom.

As used herein, "fly ash" will refer to any part of the post-combustion ash that is carried away with the exhaust, or flue gases during combustion and subsequently separated from the exhaust gas stream.

As used herein, "combined ash" will refer to combustion ash that comprises a combination of bottom ash and fly ash.

As used herein, "mined ash" will refer to ash that was once landfilled and subsequently excavated.

As used herein, "pre-processed ash" will refer to combustion ash that has been subjected to prior pre- or post-combustion processing methods.

As used herein, the term "wet process" or "wet separation process" means any process wherein water is added to make a slurry or liquid/solid suspension.

As used herein, the term "dry process" or "dry separation process" means any process that does not utilize a slurry or liquid/solid suspension.

As used herein, the term "ferrous" means any metal or alloy that is primarily made up of iron or steel.

As used herein, the term "nonferrous" means any metal other than iron or alloys that do not contain an appreciable amount of iron. Examples include aluminum, copper, lead, zinc, nickel, titanium, and precious metals.

As used herein, the term "ferromagnetic" means any metal that is strongly attracted to magnets with relatively low magnetic field strength, for example from around 500 gauss to around 3000 gauss, and/or exhibits spontaneous (or permanent) magnetization. In other words, ferromagnetic metals are highly or strongly magnetic. Examples include, but are not limited to, iron (Fe), nickel (Ni), cobalt (Co), and the 17 rare-earth (lanthanide) metals (cerium, lanthanum, yttrium, gadolinium, promethium, etc), and also includes many different alloys (i.e. steel).

As used herein, the term "paramagnetic" means any metal that is less strongly attracted to magnets than are ferromagnetic materials and exhibits magnetization only in the presence of an externally applied magnetic field. A "highly paramagnetic" material as used herein would require a magnet with a higher field strength, i.e. about 4000 gauss to about 8000 gauss. A "lowly paramagnetic" material as used herein would require a magnet with even higher field strength, i.e. about 10,000 gauss to about 20,000 gauss. Examples include, but are not limited to some iron-containing minerals, magnesium, lithium, and tantalum.

As used herein, the term "nonmagnetic" means any metal or nonmetal that is not attracted or retained by the series of magnets applied in the process described herein. This would also include non-magnetic alloys, such as certain types of austenitic stainless steel.

As used herein, the term "screen" or "screening" refers to any process or apparatus used to separate a feed stream into at least two grades (e.g. different size cuts) and includes both dry screening and wet screening. It is contemplated that any conventional screening mechanism known to those skilled (i.e. including but not limited to, vibrating screens, gyratory screens, moving screens, static screens, horizontal screens or inclined screens) are within the scope of this invention, unless otherwise stated.

As used herein, the term "wire" means a length or filament of metal with a high aspect ratio of length to diameter and may include a mix of ferrous, stainless steel and nonferrous wire.

As used herein, the term "coin" means a piece of metal formed and issued by the authority of a government as a unit of currency.

Throughout this disclosure and examples, periodically there will be process or component designators, such as "$L_n$" or "$25_n$", and it is the intent that these variables represent additional processes, delineations, or classifications in a context appropriate manner, unless otherwise specified in the text. As an example, at several points throughout the embodiments of the present invention, it is possible to divide process streams or products into two or more product streams or classifications, and the use of a variable such as "$L_n$" or "$25_n$" is intended as a non-limiting representation regarding the number of products, streams or classifications for the purpose of illustration only.

Figure 1B:
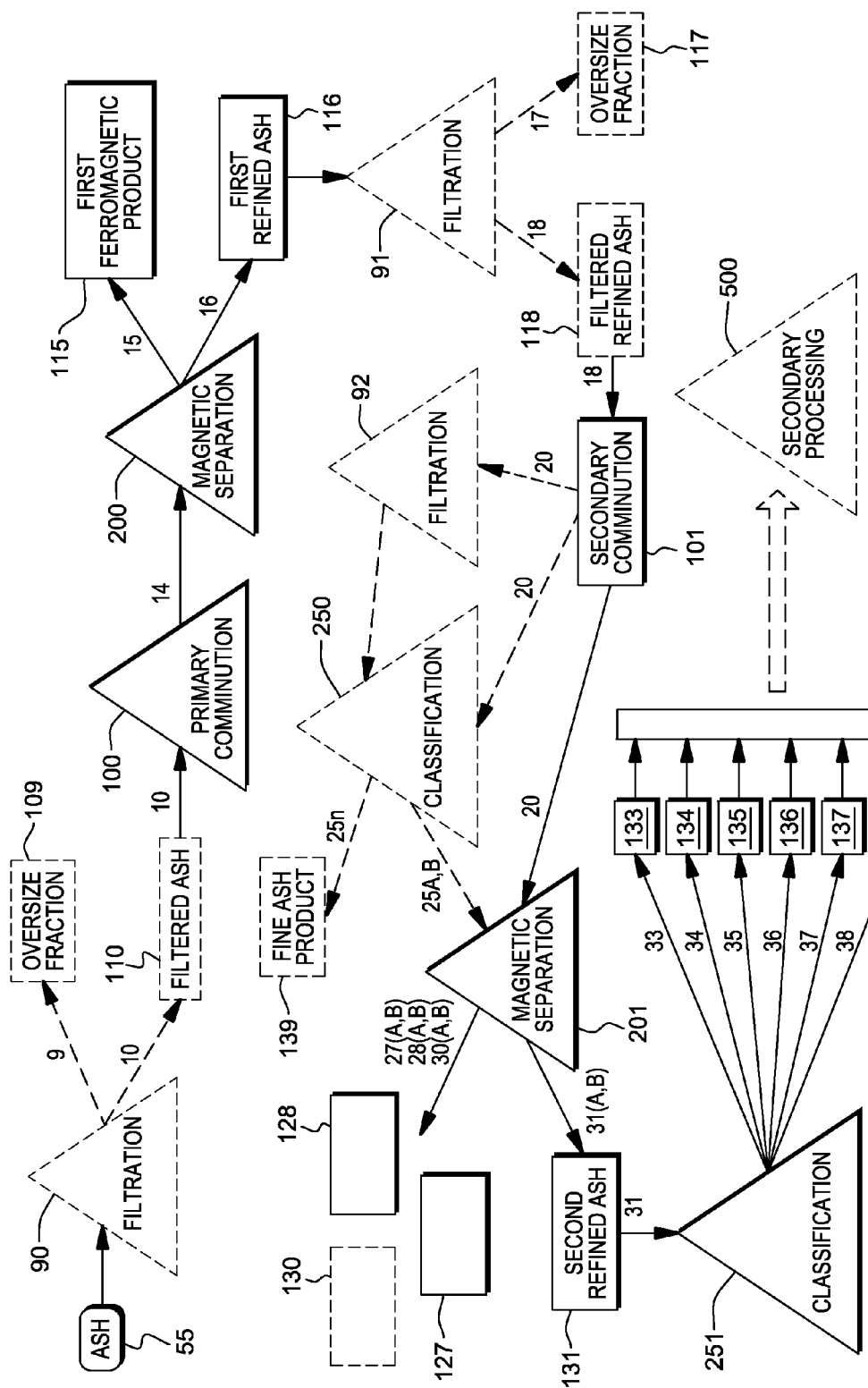
FIG. 1B is a flow diagram of one or more embodiments in accordance with the present invention.
Figure 1C:
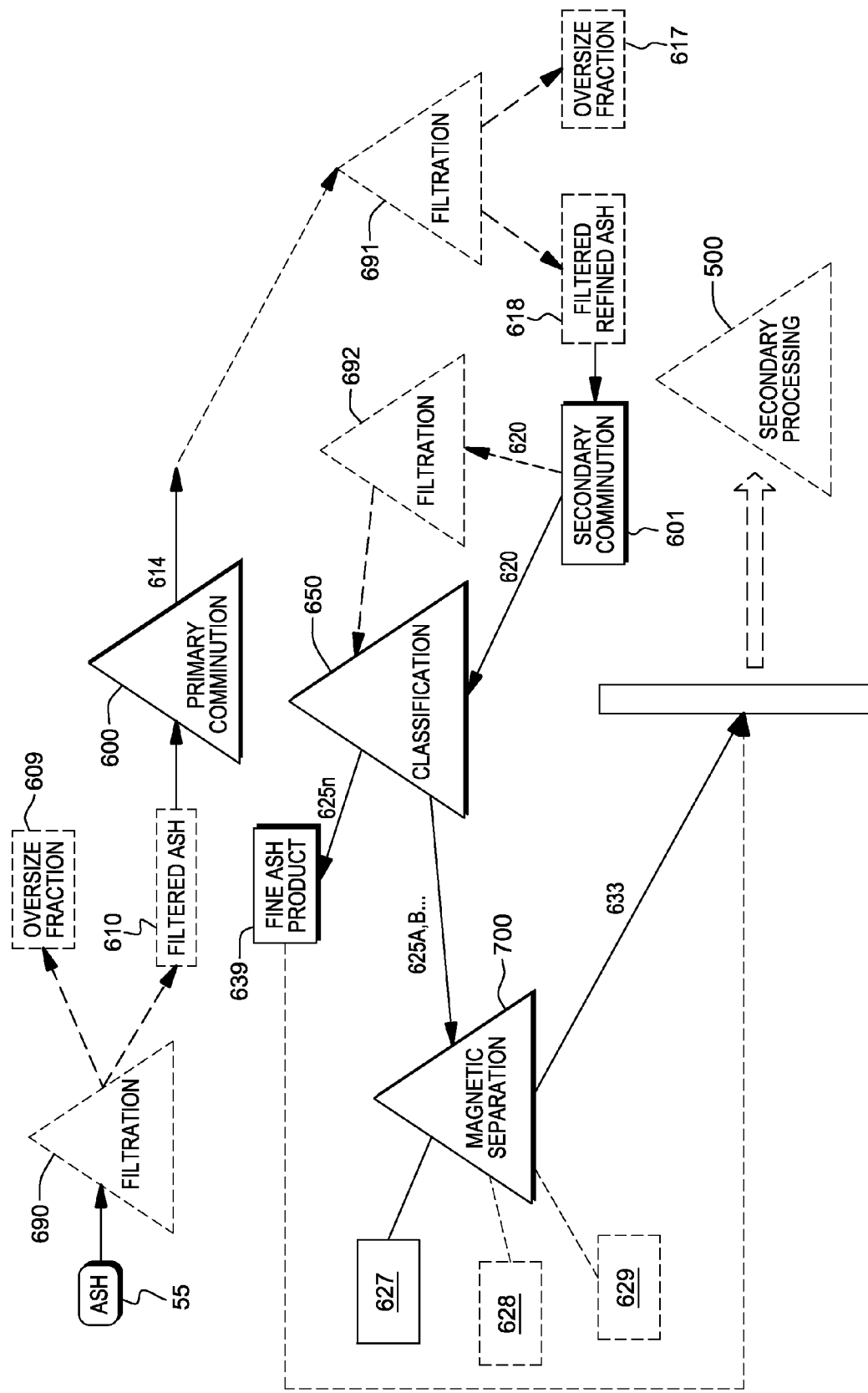
FIG. 1C is a flow diagram of one or more embodiments in accordance with the present invention.

FIG. 1A illustrates a conventional process for recycling post-combustion ash 1 from a WTE plant, while FIGS. 1B-C show generally flow diagrams of various embodiments within the scope of the present invention. As will be explained below, the dotted lines in FIGS. 1B-C represent optional or alternative steps in the process.

As shown generally in FIG. 1B, one embodiment of the invention provides a process for recovering ferrous and nonferrous metals from ash 55, the method including the steps of providing ash 55, such as from a waste-to-energy (WTE) process; comminuting the ash in primary comminution step 100 to create comminuted ash 14; applying a magnetic field to the comminuted ash 14 in first separation step 200, thereby removing first ferromagnetic product 115 from the comminuted ash and creating first refined ash 116; comminuting the first refined ash 116 in a secondary comminution step 101 to create comminuted refined ash stream 20; removing magnetic metal particles from the comminuted refined ash stream 20 in second separation step 201, thereby creating second refined ash 131 and magnetic particle streams (27, 28, 30); and separating second refined ash 131 into at least two types of product streams in classification step 251.

In accordance with the invention, and by way of example only, the at least two types of products produced by classification step 251 comprise mixed, nonferrous metal concentrates 133 and mineral sand products 134-138. As one other example, the at least two types of products produced by classification step 251 comprise mixed nonferrous metal concentrates with varying cut sizes and one remnant ash product. In this latter embodiment, any remnant ash that was not of sufficient grade to form a mineral sand product would be disposed of in a manner known in the art. As shown in FIG. 1B, the at least two product streams can then optionally be subjected to secondary processing 500 to produce additional metal recovery and/or cleaner mineral sands.

Referring to FIG. 1B, in alternative embodiments, additional processing steps include, but are not limited to, filtering ash 55 via first filtration step 90 to create filtered ash 110 prior to first comminution step; filtering the first refined ash 116 to form filtered refined ash 118 in second filtration step 91 prior to secondary comminution step; and classifying comminuted refined ash 20 into at least three particle size streams (25A,B,n) prior to second separation step 201, wherein the finest particle size (e.g., −70 mesh, or alternatively, −140 mesh) is removed via stream 25n and ultimately stored as ultra-fine ash product 139.

As shown generally in FIG. 1C, another embodiment of the invention provides a process for recovering ferrous and nonferrous metals from ash 55, the method including the steps of providing ash 55, such as from a WTE process; comminuting the ash in primary comminution step 600 to create comminuted ash 614; comminuting the comminuted ash 614 in a secondary comminution step 601 to create comminuted ash stream 620; classifying comminuted ash 620 by particle size into at least one remnant, fine ash stream 625n (i.e. smallest particle stream) and at least one larger-cut particle stream 625A,B, . . . ; and removing magnetic metal particles from the at least one larger-cut particle stream 625A,B, . . . in magnetic separation step 700, thereby creating fine ash product 639, mixed, nonferrous metal product 633 and at least one ferrous metal product 627. Referring to FIG. 1C, in alternative embodiments, additional processing steps include, but are not limited to, filtering ash 55 via first filtration step 690 to create filtered ash 610 prior to first comminution step 600; filtering comminuted ash 614 to form filtered ash 618 in second filtration step 691 prior to secondary comminution step 601; and drying filtered ash 610 to create a dried ash stream (not shown). By way of example only, the aforementioned embodiment might be utilized when the source of ash 55 is a combined ash source that will not render a commercially valuable mineral sand product (i.e. will not pass TCLP). In such a situation, the process in accordance with the invention would produce a single stream of remnant or fine ash 639 and multiple streams of combined ferrous/non-ferrous concentrates, which in turn could be separated into nonferrous metals, ferrous metals, or combinations thereof. In alternative embodiments, and as shown in FIG. 1C, the at least two metal product streams and/or fine ash 639 can then optionally be subjected to secondary processing 500 to produce additional metal recovery and/or cleaner mineral sands.

As will be illustrated below, embodiments of the present invention provide a method of extracting substantial quantities of ferrous metals, stainless steels, and nonferrous metals from WTE ash. In particular, and in accordance with the invention, the embodiments described herein are particularly adept at extracting small metal particle sizes that typically are more difficult to capture. The embodiments are also capable of extracting and recovering rare earth metals. Additionally, the metal concentrates produced are of a higher quality (i.e. higher metal concentrations), thus reducing or even eliminating the need for additional, intermediate processing to increase metal concentrations.

The above advantages and objects of the invention are the result of a combination of different factors including: 1) a substantial degree of metal liberation; 2) a particle size classification process that produces narrower size cut ranges in the process streams; and 3) an enhanced magnetic separation process as applied to the narrower size cut ranges, optionally coupled with progressively higher magnetic field strengths. In certain embodiments, multiple narrow-size-cuts in the process streams also enhance separation by specific gravity.

As described herein, intensive comminution liberates the metals from ash agglomerates by breaking down the brittle ash to sizes predominantly smaller than the coarser, more malleable metal particles. This substantial degree of metal liberation allows for recovery of the desired metal particles via segregation, concentration and extraction without requiring the use of eddy current separator systems. Additionally, by practicing the invention, one can extract metal particles with sizes much smaller than can be extracted by conventional WTE ash recycling methods which extract larger metal particles, typically greater than about 0.25 inch. These processes are limited in their ability to extract finer particles of metals, particularly nonferrous metals, and are not conducive to a high degree of liberation of metal particles from the ash agglomerates. Wet ash further deteriorates the degree of liberation and causes further degradation of metal recovery and the quality of metal concentrates recovered. Thus, in certain embodiments described herein the application of a drying process to achieve a degree of moisture reduction in the wet ash facilitates an increased degree of liberation and increased metal recovery at higher concentrations.

Each of the above factors are described in more detail in the embodiments disclosed herein and illustrated in FIGS. 2-10.

Figure 2:
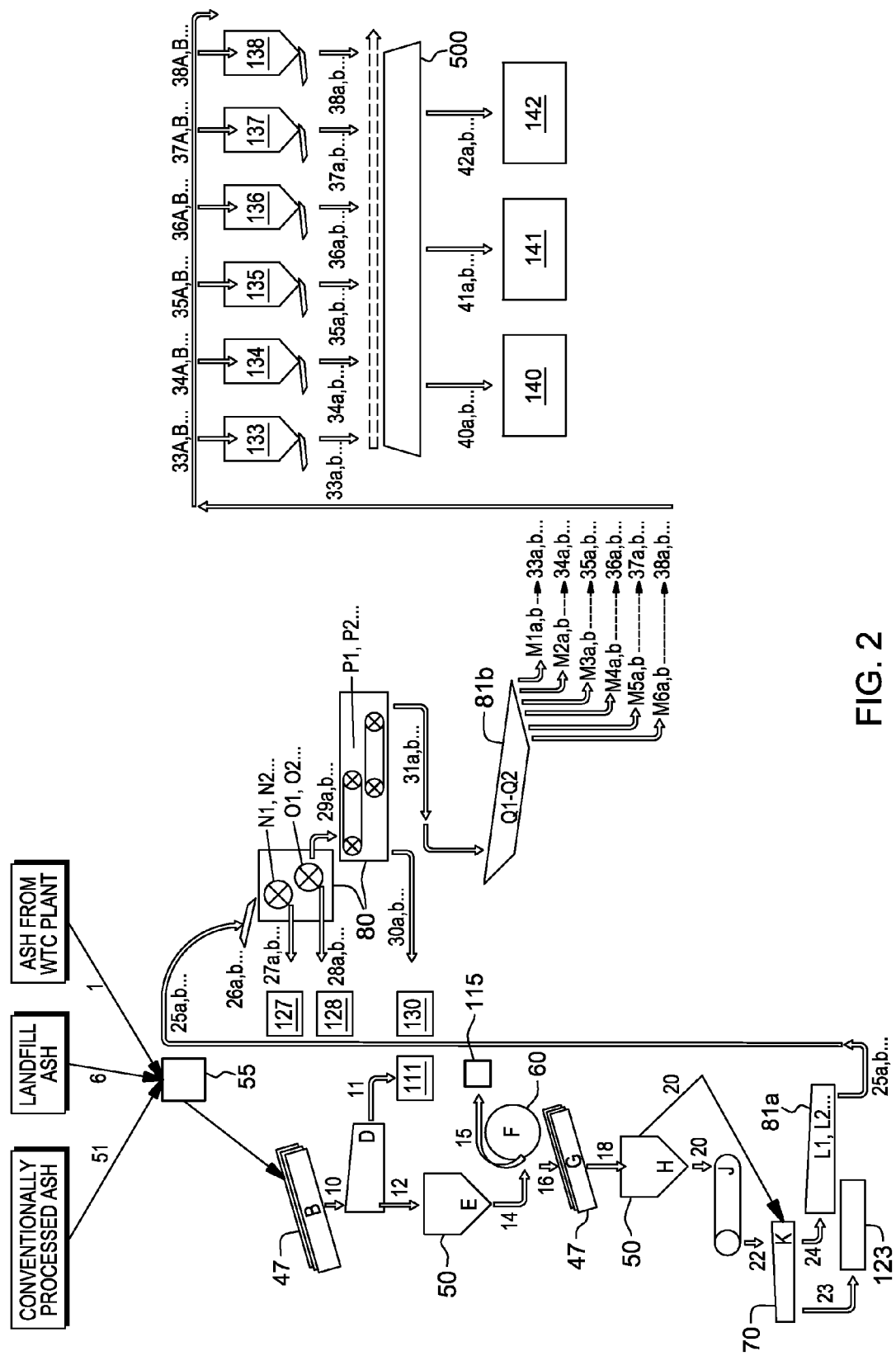
FIG. 2 is a detailed schematic that illustrates one or more embodiments in accordance with the present invention.

FIG. 2 shows one embodiment of an ash recycling process within the scope of the present invention. In accordance with the invention, the starting feed material is ash 55. It is contemplated as within the scope of the present invention that ash 55 may be obtained from a variety of sources. One exemplary source of ash 55 includes the combustion ash output from an incinerator/boiler at a WTE plant. For example, represented as stream 1 in FIG. 2, one source of ash 55 would be a direct stream of post-combustion ash from the WTE plant that has not yet been processed. In certain embodiments, the post-combustion ash may comprise bottom ash only, while in other embodiments the post-combustion ash comprises combined ash. Furthermore, the ash may be either dry- or wet-quenched to cool it sufficiently before further processing. If wet-quenched, a preferred approach is to age (i.e. store) the ash for a sufficient length of time to allow the moisture content of the ash to decrease so as to feed the process with material that has a moisture content sufficiently low enough to provide for adequate liberation of particles and reduced agglomeration. More specifically, the moisture content of the ash would be less than about 20%, preferably less than about 15%. In still other embodiments, wet-quenched ash could be subjected to a drying step to achieve similar results.

Another source of ash 55 is the output from a prior conventional ash process that has already removed a portion of the ferrous and nonferrous metals from the ash. This source of ash material 55 is represented in FIG. 2 by stream 51. For example, in certain embodiments combustion ash 1 has been pre-processed via a preliminary separation or recycling step. Any conventional or other means known to one of ordinary skill in the art would be suitable for the pre-processing step, for example but not limited to, processing the ash through magnetic separators to extract ferrous metals 7 and eddy current separators to extract nonferrous metals 8, both before and/or after the combustion step in a WTE plant (see, e.g., FIG. 1A). Even with pre-processing removal of ferrous and nonferrous metals 7, 8 from combustion ash 1, embodiments of the present invention can extract a relatively substantial volume of additional high quality, concentrated ferrous and nonferrous metals when the conventionally pre-processed remnant mixture 51 is used as the starting feed material for ash 55 (see Chart II).

Yet another source of ash material 55 is "mined ash" from a landfill, i.e. combustion ash that has already been deposited in a land fill. This previously landfilled ash can be dug up, or "mined", and used as a starting feed material for the process described herein. This source of ash material 55 is represented in FIG. 2 by stream 6.

In certain embodiments, ash 55 initially is filtered via one or more filtering means, shown as filtering or sorting mechanisms 47 in FIG. 2 (i.e. optional filtration step 90 in FIG. 1B). In preferred embodiments, filtration step 90 comprises dry filtration means only. In this step, over-size materials that are not suitable for primary comminution (for example, are too large for the primary crusher "E") may be removed by a filtering mechanism 47 prior to entry into the crusher. An example of one such filtering mechanism 47 is the use of a grizzly scalper (a/k/a grizzly feeder or grizzly screen) (see B, in FIG. 2). As used herein, the term "scalping" or "scalp" refers to the separation of oversize materials from a feed of predominately finer feed. The term "scalper" refers to any commercially available heavy-duty vibrating screen that functions to separate materials within a particular feed stream by size. One of ordinary skill in the art will recognize that, although scalpers typically are designed with grizzly bars or heavy-duty perforated plate, as used herein, a scalper can be equipped with various decking materials and openings and can perform various functions in a variety of applications in accordance with known technologies.

Figure 10:
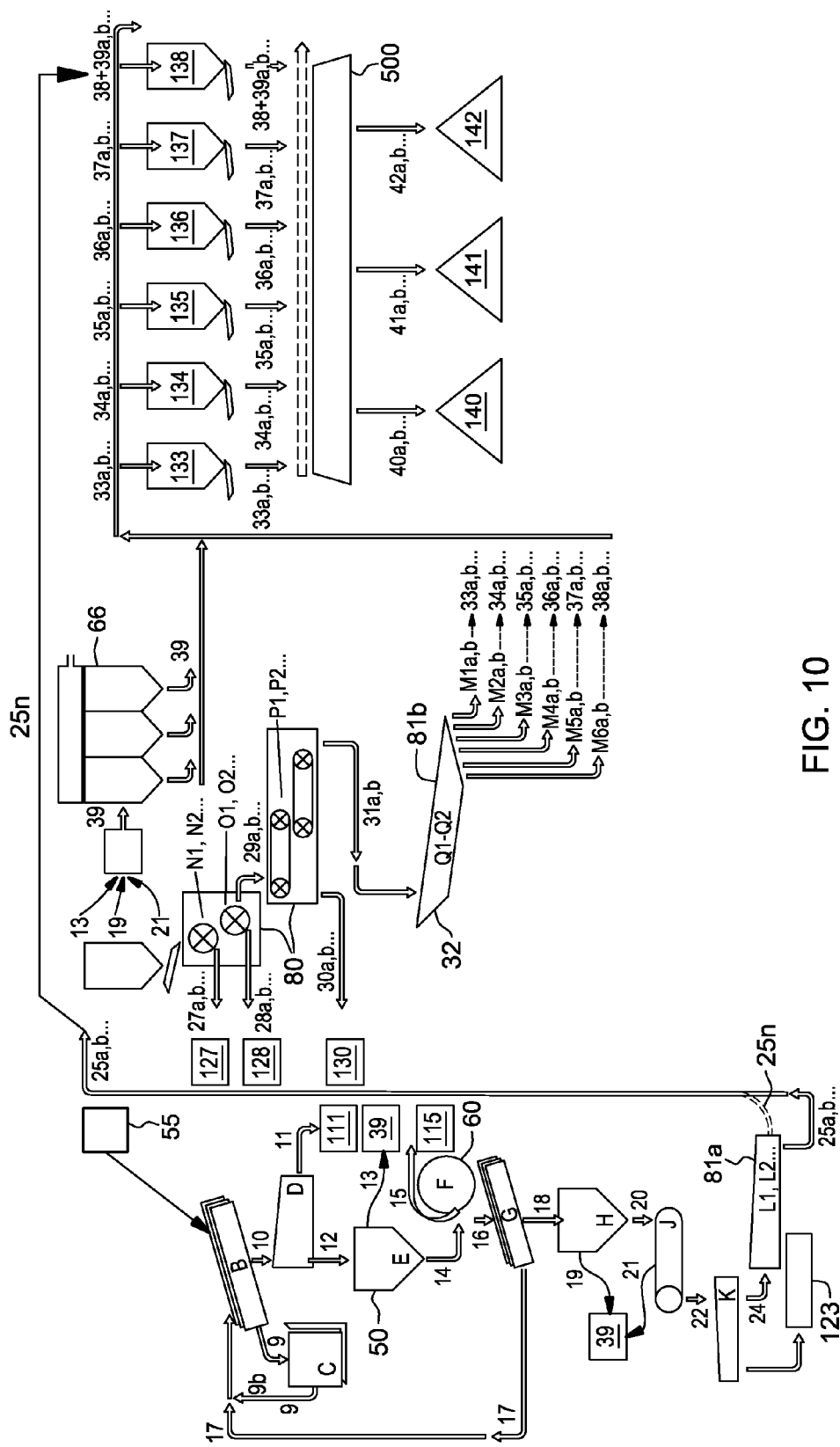
FIG. 10 depicts one detailed example of the invention.

In certain embodiments, although not shown here, the oversize particles separated out (or extracted) via filtering mechanism 47 may be recirculated back to be reduced in size or taken completely out of circulation (see example illustrated in FIG. 10, specifically oversize stream 9). Additionally, one of ordinary skill in the art would recognize that any other means for mechanical screening or types of screening mechanisms for removing coarse or oversize aggregates or other large foreign materials that are not suitable for comminution that are known in the art could be used for first filtration step 90.

Another example of filtering mechanism 47 that could be used for filtration step 90 would be a coin extractor (see D, in FIG. 2). During this process step, liberated coins are extracted or "scalped" from the ash stream prior to any crushing to prevent damage to the coins. This optional operation produces coin stream 11 and coin product 111, and is described in more detail in the example illustrated by FIG. 10 herein. In addition to those described above, one of ordinary skill in the art will recognize that first filtration step 90 may include one or more, or a combination of, different filtering mechanisms 47, including but not limited to those described above, depending on the characteristics of the starting feed material and the capacity of the primary crusher (E) and secondary milling machine (H), as discussed below.

As shown in FIG. 2, filtration mechanism 47 produces a filtered ash stream 10 (or 12, if filtered ash stream 10 is also processed through coin extractor D). Filtered ash stream 10/12 is then comminuted (for example, crushed) to reduce the particle size of the brittle, nonmetal particles contained therein and to liberate at least a portion of the metal particles entrapped therein. In FIG. 2, this comminution step is completed using a crushing/milling mechanism 50 (i.e., comminution means). In one or more embodiments of the invention, and as shown in FIG. 2, comminution means 50 is a primary crusher (E). Specific examples of primary crusher E include impact crushers (e.g. horizontal shaft impactor or hammer mill), gyratory crushers, jaw crushers, cone crushers, etc. However, one of ordinary skill in the art would recognize that any other means or mechanisms for crushing filtered ash stream 10/12 (i.e. decreasing the ash to a specified particle size through impact, compression and grinding) that are known in the art could be used and that the selection will depend on a number of factors, such as composition of source material, feed size, end-product desired, tonnage requirements, local conditions, and initial and operating costs. These determinations can be made by those skilled in the art. In preferred embodiments, the crusher will be selected so as to optimize the size reduction of the ash and substantially liberate the more malleable metal particles from the brittle ash particles. Other examples of comminution means 50 that would be suitable for primary comminution step include, but are not limited to jaw crushers, cone crushers, gyratory crushers, impact crushers (horizontal shaft impactors & vertical shaft impactors).

This comminution step via comminution means 50 (step 100 in FIG. 1B) produces a comminuted ash stream 14. Comminuted ash 14 is then subjected to separation step 200. Separation step 200 is completed using a magnetic separation mechanism 60 (i.e., magnetic separating means). More specifically, magnetic separation mechanism 60 separates comminuted ash stream 14 into two fractions, a ferromagnetic fraction 15 and a relatively non-magnetic fraction, or first refined ash stream 16. In the embodiment shown in FIG. 2, magnetic separation mechanism 60 is a "scalping magnet" (F) that is placed immediately after the primary crusher (E) and adjusted to capture over-size ferrous metal to prevent damage to the secondary mill (H). For separation step 200, other examples of magnetic separation mechanism 60 include, but are not limited to drum magnets, self-cleaning cross-belt magnets, manual cleaning magnets, etc., and one of ordinary skill in the art would recognize that other means or types of mechanisms that are known in the art and that cause the desired separation of metals could be used, and furthermore, that the selection of the magnetic separator will be based on the size, composition and magnetic properties of ash stream 14.

In the embodiment shown in FIG. 2, magnetic separation mechanism 60 (separation step 200 in FIG. 1B) produces a first ferromagnetic product 115 and a first refined ash 116 with reduced metal content. First refined ash 116 will consist of both nonmetal ash particles and remnant metal particles (both magnetic and nonmagnetic) that were not removed by separation step 200.

Referring to FIG. 2, first refined ash stream 16 is then filtered via one or more filtering mechanisms 47 (i.e. filtration means) in filtration step 91. Filtration step 91 produces filtered refined ash stream 18. Filtering step 91 comprises one or more filtering mechanisms 47 (i.e. filtration means). In preferred embodiments, filtering mechanism 47 comprises dry filtration means only. As discussed above, one example of a filtering mechanism 47 is the use of a grizzly scalper (see B, in FIG. 2) or oversize scalping screen (see G, in FIG. 2). Although not required, in the embodiment shown in FIG. 2, scalping screen G (e.g., a 1½" scalping screen) is used immediately after scalping magnet (F). One of ordinary skill in the art will recognize that filtration step 91 may include one or more, or a combination of, different filtering mechanisms 47 suitable to create filtered refined ash stream 18, including but not limited to those described above, depending on the characteristics of first refined ash 116 and the capacity of the secondary milling machine (H), as discussed below. For example, although not required or shown in FIG. 2, in still further embodiments a second coin extractor can be placed immediately after the primary crusher (E) to capture any remnant coins liberated via the primary crusher (E). The second coin extractor can be preferentially incorporated into the oversize scalper unit (G).

The filtered, refined ash stream 18 is then comminuted again to liberate additional metal particles from within the ash. This secondary comminution step is completed using another crushing/milling mechanism 50 (i.e., comminution means). In one or more embodiments of the invention, and as shown in FIG. 2, the secondary comminution step is accomplished via secondary mill (H), for example a 4-row cage mill or ball mill or vertical shaft impactor. In this step, the refined ash stream 16/18 is subjected to very intense milling to produce a comminuted refined ash stream 20 with a substantially reduced particle size and to substantially liberate the remaining metals in the ash. In accordance with the invention, a substantially reduced particle size comprises substantial portions of nonmetal particles with a particle size less than about 2 mm, preferably less than about 1 mm, and even more preferably, consists of substantial portions below about 0.1 mm. One of ordinary skill in the art will recognize that these particle sizes correspond to about −10 mesh, −18 mesh, and −140 mesh, respectively. The reference to a 4-row cage mill is intended to be a specific, non-limiting example of a milling mechanism 50 (or secondary mill). Although one of ordinary skill in the art will recognize that there are several designs of secondary mills that can be used for this process step, a preferred embodiment will allow control of the particle size distribution, degree of liberation, and proportion of very fine ash. Other examples include, but are not limited to, rod mills, sag mills, ball mills, vertical shaft impactors, and any other means or mechanisms for milling or grinding ash that are known to those skilled in the art could be used and that the selection will depend on a number of characteristics such as composition of source material, feed size, end-product desired, tonnage requirements, local conditions, and capital and operating costs. These determinations can be made by those skilled in the art and, preferably, will be selected to optimize the production of fines and substantially liberate the more malleable metal particles from the brittle ash.

Crushing/milling mechanism 50 (i.e. secondary comminution step 101 in FIG. 1B) produces a comminuted refined ash stream 20. In certain embodiments, although not required, comminuted refined ash stream 20 may optionally undergo a drying trim operation (J) immediately following comminution step 101 (see FIG. 2) to create dried ash stream 22. In alternative embodiments, and, as one of ordinary skill in the art will recognize, the drying operation may be moved earlier in the process, for example prior to primary comminution 100 or secondary comminution step 101 (not shown) dependent on the moisture content of the ash.

Although not required, in certain embodiments ash stream 20/22 will then be subjected to yet a third filtration step. Referring to FIG. 2, a third filtration step may comprise, for example, a mechanical screening or scalping mechanism 70. In the embodiment shown in FIG. 2, screening mechanism 70 is a wire scalping device (K). Wire scalping device K is after the secondary mill (H) and removes wire from ash stream 20/22. Third filtration step 92 produces a wire product stream 23 and reduced-wire ash stream 24. According to many embodiments, wire product stream 23 can be sold as a mixed-metal product 123, or wire product stream 23 may be subsequently processed in a sequence of wire chopping granulation, magnetic separation, and nonferrous separation (such as gravity separation, tabling, etc) to produce valuable recycled metal product streams from the recovered wire. Other examples of a mechanical screening mechanism 70 that could be utilized after secondary comminution step include, but are not limited to, a finger deck, rod deck, or perforated plate.

In the exemplary embodiment shown in FIG. 1B, immediately before second separation step 201, the ash is classified into at least two different streams in classification step 250. For example, in the embodiment shown in FIG. 2, streams 25a,b, . . . of comminuted refined ash are created by passing ash stream 24 (or, alternatively, ash stream 20/22) through size classifier mechanism 81a. In this embodiment, size classifier mechanism 81a comprises two multi-size classifiers L1/L2 that are used to separate and optimize ash stream 24 into two or more streams with different ranges of cut sizes (see, e.g., classified streams 25a,b . . . ) to optimize subsequent processing performance during magnetic separation via optimal tuning of parallel magnetic separation lines according to particle size range. In alternative embodiments (see FIG. 1B and FIG. 10), size classifier mechanism 81a comprises one or more multi-size classifiers L1/L2/Ln, depending on required through-put capacity. In these embodiments, the classifiers are used to separate the finest particle 25n (e.g., any particles less than about −70 mesh or about −140 mesh), from the larger cut streams (e.g. 25a, 25b, . . . ) thereby creating at least three different size cut streams. In such embodiments, the finest cut stream 25n can be by-passed around the magnetic separation circuit to improve efficiency of magnetic separation while conserving useful capacity of the magnetic separation equipment. The finest cut stream 25n can be further processed or sent to a silo for storage as a fine ash mineral sand product 138, depending on the character and composition of the material and the needs of customers in the marketplace. In accordance with the invention, and as used throughout, the term one or more multi-size classifiers includes one or more size classification machines, either in series or in parallel, one size classification machine with multiple decks, or combinations thereof depending on required through-put capacity and desired output streams.

Classification step 250 can be accomplished using one or more size classification or separation means or methods known to those skilled in the art, preferably at least one dry separation technique such as mechanical screening or pneumatic aspiration. Alternatively, one or more additional stages of the classification step can be performed by adding water to form a slurry for subsequent wet processing using wet classification and separation processes. As a result of classification step 250, the coarser cut fractions are split into two or more classified streams 25a,b, . . . from coarser to finer, to facilitate enhanced removal of magnetic ferrous metals. The determination of how to split the coarse size fractions into two or more classified streams will ultimately depend on a number of factors and the desired output. However, in preferred embodiments, the amount of material in each of the classified streams will be approximately equal, but weighted toward utilizing higher proportions on the coarser cuts if possible to optimize efficiency. In another example, if only two streams 25a,b are desired, a little more than half of the material may be in the coarsest stream 25a and a little less than half in the finer stream 25b.

Each of these streams is then separately run across a multi-phase magnetic separation system 80 in second separation step 201. In FIG. 2, multi-phase magnetic separation system 80 is shown as three (3) separation units N1/N2, O1/O2, and P1/P2, thereby creating three (3) magnetic metal particle streams designated as 27a, b; 28a, b; and 30a, b. One of ordinary skill in the art would recognize, however, that in accordance with the invention, more or less than three separation systems 80 is also possible, which in turn would produce more or less than three product streams. In preferred embodiments, each separation unit within the multiphase separation system 80 is tuned for a specific size cut range, and is operated with a progression of higher magnetic field strengths to progressively remove a series of magnetic iron-bearing particles, including, for example, ferromagnetic particles; high paramagnetic particles; and low paramagnetic particles from the ash stream resulting in magnetic metal products 127, 128, & 130, segregated according to iron concentration. Additional product streams may be added (e.g. ferrimagnetic products) or deleted (i.e. low paramagnetic products may not be commercially valuable).

For illustration purposes only, FIG. 2 shows two streams of ferromagnetic particle streams (27a, b) with varying sizes, two streams of highly paramagnetic particle streams (28a, b) with varying sizes, and two streams of low paramagnetic particle streams (30a, b) with varying sizes. It should be noted, however, that methods producing more or fewer than two products are contemplated as within the scope of the invention. This segregation approach facilitates and provides for the isolation of desired products, for example, the separated ferromagnetic products 127 and paramagnetic products 128, 130, which may be utilized in separate product applications in the market place.

In the embodiment shown in FIG. 2, in addition to the at least one magnetic product discussed above, second separation step 201 also produces at least one stream of second refined ash 131 with reduced metal content. Second refined ash 131 will comprise nonmetal ash particles that have been substantially reduced in particle size. More specifically, the nonmetal ash particles found in second refined ash 131 will have a particle size of less than about 2 mm (i.e. smaller than the openings of a 10 mesh screen, i.e. −10 mesh), preferably less than 1 mm (i.e. smaller than the openings of a 18 mesh screen, i.e. −18 mesh), and substantial portions even below about 0.1 mm (i.e. smaller than the openings of a 140 mesh screen, or −140 mesh). Second refined ash 131 will also comprise relatively nonmagnetic metal particles that were not removed by separation step 201.

After removal of the ferrous metals and minerals, FIG. 2 shows two or more streams 31*a,b* of second refined ash of varying sizes that are further subdivided and size classified in classification step 251 via size classifier mechanism 81*b*. In this embodiment, size classifier mechanism 81*b* comprises parallel multi-size classifiers Q1-Q2, such as multi-deck screening machines, to break down second refined ash streams 31*a,b* into multiple streams 33*a,b*-38*a,b* of varying cuts, each with narrower size ranges (designated in FIG. 2 as mesh sizes M1-M6). In accordance with the invention, one example of a multi-size classifier would be a 5-deck sizing screen. A sizing screen is intended to be a specific, non-limiting example of a size classifier mechanism 82 and one of ordinary skill in the art would recognize that any size classifier mechanism suitable for separating materials by size could be employed. The number of multi-size classifiers Q1-Qn used will depend on the required through-put capacity.

Classification step 251 produces at least one stream of relatively nonmagnetic metal product and at least one, but in this example more than one, stream of remnant ash with a substantially reduced metal content. The relatively nonmagnetic metal product, or nonferrous metal and NMSS (nonmagnetic stainless steel) concentrates 133*a,b*, are produced from the coarsest streams 33*a,b*, while the remnant ash streams 34*a,b*-38*a,b* largely produce mineral sand products 134-138. The concentration of nonferrous and NMSS metals in the coarser cuts is the result of reducing the bulk of the brittle, nonmetallic ash to a substantially smaller particle size, e.g. less than about −10 mesh (2 mm), via comminution steps 100/101, which in turn leaves the bulk of the more malleable, nonferrous and NMSS metals in the coarser cuts.

The value of the nonferrous metal and NMSS concentrates 133*a,b* is dependent on the purity of the recovered metals and the mix of metals. As used herein, the designation "Zorba" is one of various commercial code words established by the Institute of Scrap Recycling Industries, Inc. (ISRI), for a particular scrap grade of non-ferrous metals. Shredded, mixed nonferrous scrap, a/k/a "Zorba" product, is made up of a combination of nonferrous metals: aluminum (predominantly), copper, lead, magnesium, stainless steel, nickel, tin, and zinc, in elemental or alloyed (solid) form. The number following the designation "Zorba" indicates the estimated percentage nonferrous metal content of the material (e.g., "Zorba 90" means the nonferrous material contains approximately 90% nonferrous metal content). The mesh size openings used in classification step 251 are chosen to optimize the performance of the process system for the given source material and desired end product. For example, the coarser cuts above about +10 mesh typically represent a more highly concentrated, mixed nonferrous metal concentrate, for example Zorba 90. In contrast, an 8×10 cut is typically a slightly lower grade Zorba, i.e. about Zorba 70-80.

These mixed nonferrous Zorba products, represented in FIG. 2 generally as 133*a,b*, can optionally be sold as products prior to secondary separations or be subjected to further processing for secondary separations. For example, in the case of an 8×10 mesh cut, the Zorba 70-80 concentrate can be upgraded to Zorba 90 by subjecting it to a second pass through a secondary mill (H) or other comminution steps and re-screening. In still other embodiments, the mixed concentrated nonferrous metal products 133*a,b* (or metal cons) can undergo additional secondary processing 500 to produce higher value for the mixed metal cons 133*a,b* by further treating and separating the mixed cons into different metal products.

For example, as shown in FIG. 2, one non-limiting example of secondary processing 500 would be the separation of "light nonferrous" from "heavy nonferrous" metals to produce high specific gravity (SG) nonferrous metal cons 140 and low SG nonferrous metal cons 141, which one of ordinary skill in the art would recognize as the separation of the aluminum (and possibly some magnesium) metal from the copper, brass, zinc, lead, precious metals, and NMSS. Secondary processing 500 for separating mixed nonferrous Zorba size-cuts into "light nonferrous" aluminum 141 and "heavy nonferrous" copper, brass, zinc, lead, precious metal, stainless steel concentrates 140 can be accomplished using conventional dry processes, wet processes, or a combination of dry and wet processes known in the art. For example, in certain embodiments, secondary processing 500 can separate the nonferrous metals based on differences in specific gravity, particle shape and/or particle size. Examples of methods or means used to segregate the different nonmagnetic metals include wet tabling, air tabling, wet spiral classifier circuits, jigging, upflow-hindered-bed settling, and hydrosizer processes. In certain embodiments, dry processing is effective and can have lower capital cost and lower operating cost. The foregoing list of separation means or processes for secondary processing step 500 are intended to be illustrative only and not limiting in any way, and additional secondary processing steps are also discussed and illustrated in FIGS. 5-9. Furthermore, and in accordance with the invention, although conventional means or processes may be used for secondary processing 500, the preceding process steps which provide for separating nonmagnetic ash stream 31 into multiple size cuts of narrower size ranges, enhances the ability to produce desired and valuable product streams via secondary processing 500.

These same secondary processes 500 can also be applied to the remnant ash cuts, shown in FIG. 2 as 134*a,b*-138*a,b*, to remove additional metals. For example, in certain embodiments, electrostatic separation can be used to extract finely sized metals from −10 mesh ash cuts. One of ordinary skill in the art would recognize that, if electrostatic separation is used as a secondary process 500, it is preferable that it is conducted as a dry process and for the ash to be subjected to an elevated temperature drying operation prior to electrostatic separation. For example, in this embodiment, dryer operation (J) would be desirable to enhance performance during secondary process 500 (i.e. either as shown in FIG. 2, or alternatively, at some other point during the process).

The ash product stream (designated 42*a,b* in FIG. 2) coming from these secondary metal extraction and separation processes 500 constitutes "cleaner" ash with a substantially reduced metal content. Due to the enhanced extraction of both ferrous and nonferrous metals described above, the clean ash streams 42*a,b* can produce better, cleaner mineral sand products for use as source material in making other ash-mineral-based products (such as aggregate for bricks and blocks, fillers, chemical additions, or other raw material uses). More specifically, the process described herein can be used to produce mineral sand products that contain less than the U.S. regulatory limits for contaminants under the TCLP or "7-11 test" analysis for metals and metalloids (see Table III). In still other embodiments, the mineral sand streams are maintained and stored as classified fractions with varying sizes for use as raw material. In this way, the different size cuts can be mixed in optimal proportions (e.g., via mixer 420 shown in FIGS. 6-8) to produce custom particle size distributions per customer needs and specifications. The clean ash, or mineral sand, can also be further processed into advantageous size cuts for use as a recycled mineral aggregate. This commercial use of clean ash as a recycled aggregate has the potential to provide Leadership in Energy and Environmental Design (LEED) certification to customer's products that use the ash, such as for making concrete blocks or pavers; or as chemical/mineral raw materials and compositional mix ingredients in industrial processes, e.g. for making cement clinker. Although not required, an alternate embodiment of the invention would provide for further processing of clean ash to extract, segregate, and concentrate certain of the nonmetallic phases that remain within the clean ash and that have a particular value or application.

Figure 3:
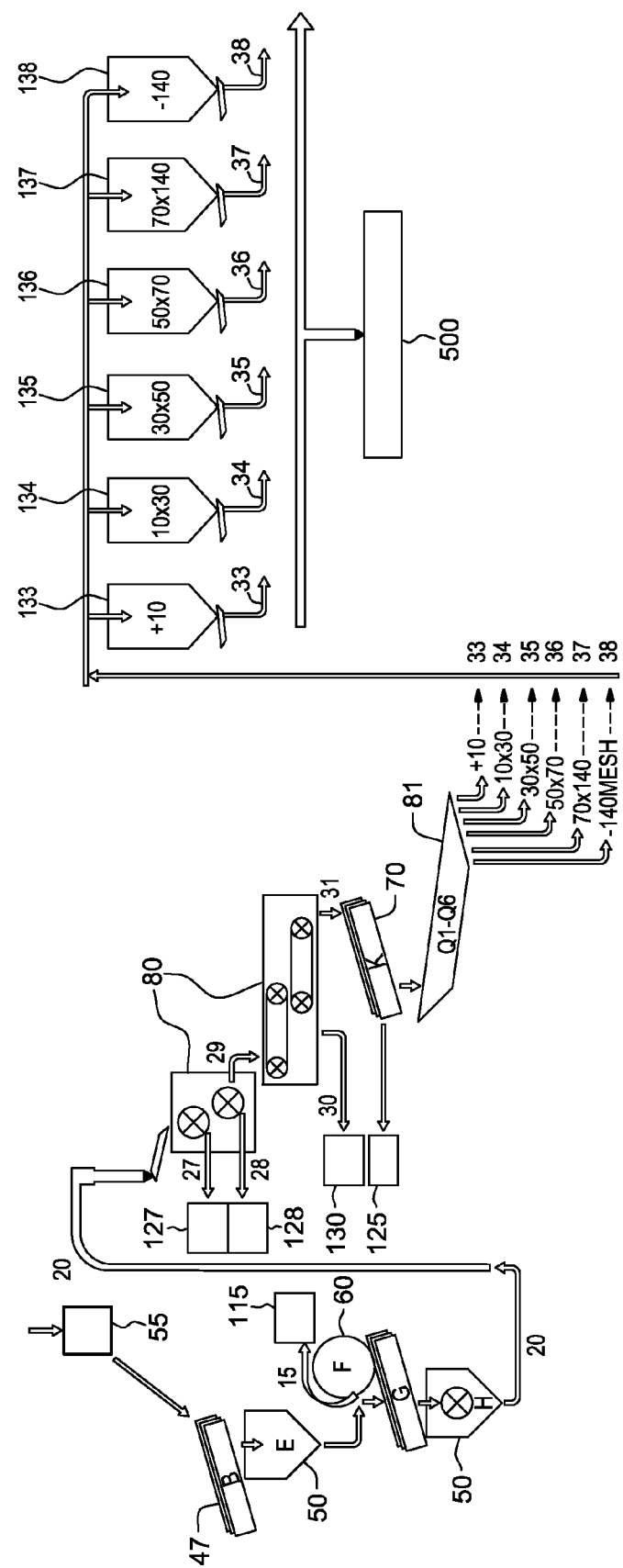
FIG. 3 is another detailed schematic that illustrates one or more embodiments in accordance with the present invention.

FIG. 3 shows an alternative embodiment within the scope of the present invention. While several of the process steps are the same or similar to those shown in FIG. 2, there are also differences, including the following. First, the steps shown in FIG. 3 do not include a coin extractor D or coin product stream 11 as shown in FIG. 2. Second, the optional dryer (J) is not present in the alternate embodiment shown in FIG. 3. Third, the third filtration 92 via separation mechanism 70, shown in FIG. 2 as a wire scalping device (K) that produces wire product 123, is not present prior to magnetic separation in FIG. 3. Fourth, the classification step 250 via size classifier mechanism 81 shown in FIG. 2 as multi-classifier L1, L2, . . . is not present prior to magnetic separation step 201 via multi-phase magnetic separation system 80 in FIG. 3. Instead, with these two steps removed, comminuted refined ash stream 20 proceeds directly to multi-phase magnetic separation system 80 without a prior, third filtration 92 or classification step 250. Fifth, a separation mechanism 70, shown in FIG. 3 as a wire scalping device K, is present after multi-phase magnetic separation system 80, which produces nonferrous (NF) wire 125. Sixth, the generic size classifications of FIG. 2 (M1$a,b$-M6$a,b$) for streams 33-38, are replaced with exemplary size classes in FIG. 3. Specifically, five size classifications are shown in FIG. 3: coarse streams 33$a,b$=+10 mesh (i.e. nonmagnetic metal stream); remnant ash streams 34$a,b$=−10×+30 mesh; remnant ash streams 35$a,b$=−30×+50 mesh; remnant ash streams 36$a,b$=−50×+70 mesh; remnant ash streams 37$a$,$b$=−70×+140 mesh; and remnant ash streams 38$a,b$=−140 mesh (i.e. ultra-fine ash stream). Seventh, the secondary processing 500 shown in FIG. 2 is not present in the embodiment shown in FIG. 3.

Figure 4:
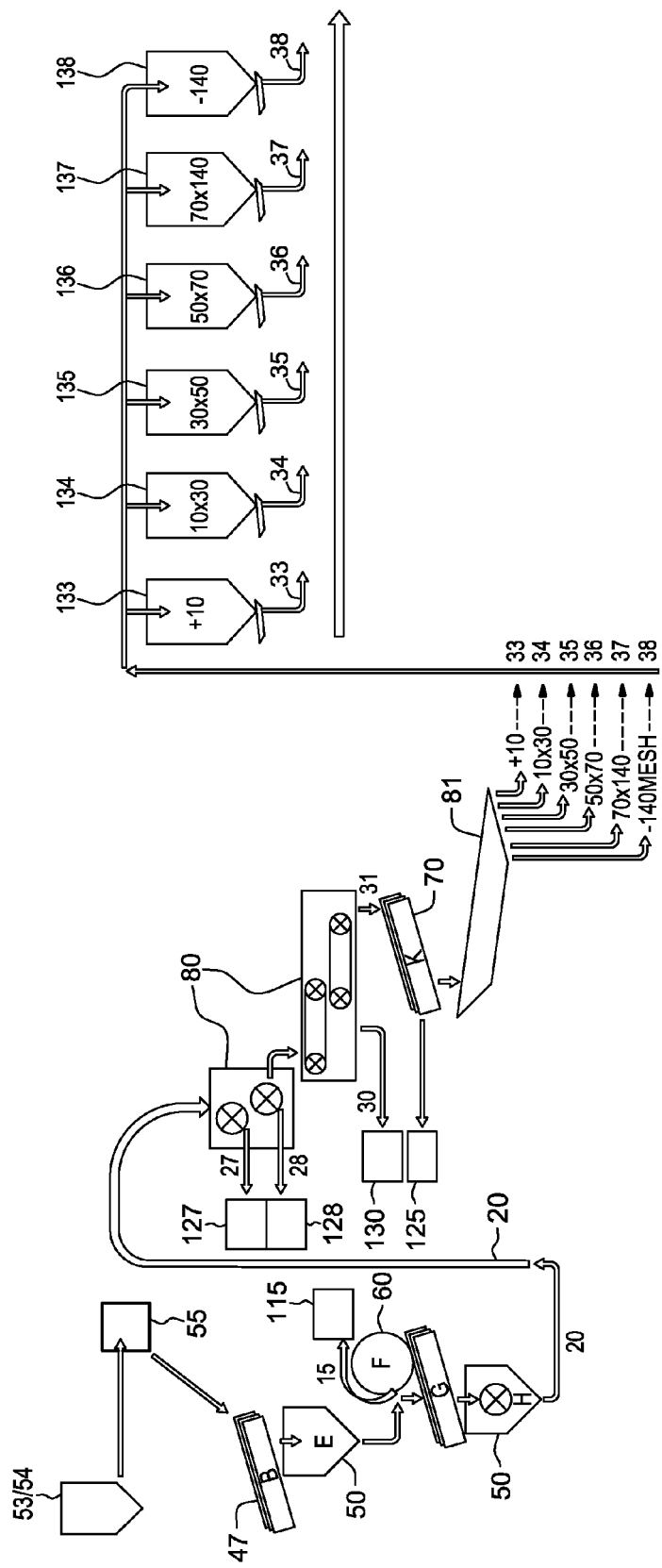
FIG. 4 is yet another detailed schematic that illustrates one or more embodiments in accordance with the present invention.

FIG. 4 illustrates yet another alternative embodiment within the scope of the present invention. Although the process steps in FIG. 4 are the same as those depicted in FIG. 3, an optional "warm quench" step 53 for drying ash 55 and/or an optional pH control step 54 are shown in FIG. 4 before ash 55 enters a first filtering mechanism 47 (i.e. grizzly screen B in FIG. 4).

For illustration purposes only, FIGS. 5-9 show several alternative embodiments for secondary processing step 500 according to various aspects of the present invention. Unless otherwise indicated, each of the embodiments depicted in FIGS. 5-9 begin with the separated product streams shown as 33-39 in FIGS. 2-4 as inputs into the optional, additional processing steps. Furthermore, unless otherwise described, the size classifications shown in FIG. 3 are used for illustration purposes only (for example, as if a 5-deck sizing screen was used). Specifically, mixed, nonferrous metal cons product 133$a,b$=+10 mesh; mineral product 134$a,b$=−10×+30 mesh; mineral product 135$a,b$=−30×+50 mesh; mineral product 136$a,b$=−50×+70 mesh; mineral product 137$a,b$=−70×+140 mesh; and mineral product 138$a,b$=−140 mesh (i.e. ultra-fine ash). These size classifications are non-limiting and for exemplary purposes only.

Figure 5:
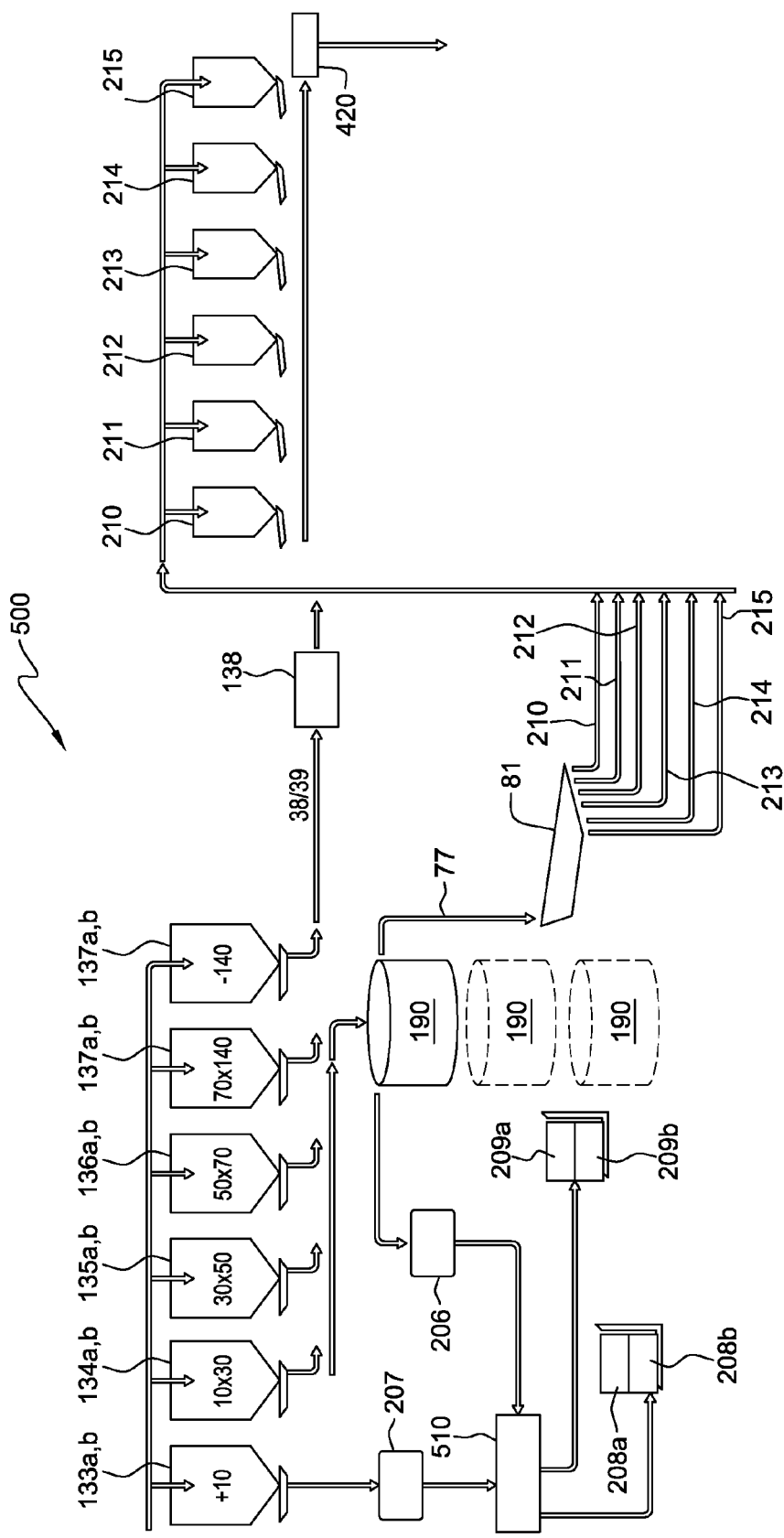
FIG. 5 depicts optional additional processing steps that may occur within the scope of the present invention after, or concurrently with, the processes shown in FIGS. 2-4.

Referring to FIG. 5, one of ordinary skill in the art will recognize that, in one or more alternative embodiments, eddy current separators (ECS) 190 can be employed as part of a secondary processing 500 to generate specific product streams. For the purposes of providing non-limiting examples only, the eddy current separators 190 in FIG. 5 are shown as advanced small particle ECSs. As also depicted, ECS 190 creates at least one fine, mixed nonferrous Zorba product 206 and ECS-processed ash stream 77.

Another alternative processing step, shown in FIG. 5 as secondary processing separation step 510, provides for the recovery of several commercially beneficial products via the separation of light nonferrous metal (e.g. aluminum) from heavy nonferrous metals (e.g copper, brass, lead, zinc, etc.) once the mixed nonferrous metals have been separated into various grades of coarse or fine nonferrous metal Zorba products. For example, as shown in FIG. 5, separation step 510 creates the following products from a coarse Zorba product 207 and a fine Zorba product 206: coarse light nonferrous metals 208$a$, coarse heavy nonferrous metals 208$b$, fine light nonferrous metals 209$a$, and fine heavy nonferrous metals 209$b$. One of ordinary skill in the art would recognize that separation step 510 can be accomplished using any one of several separation technologies known in the art.

Similarly, and as shown in FIG. 5, another alternative processing step provides for the recovery of several commercially beneficial products via the size classification of ash stream 77. In this embodiment, size classifier 81 (e.g. for example, a 5-deck sizing screen) has been placed after the ECSs to separate coarse mineral sand product 210, fine mineral sand product 211, ultrafine mineral sand product 212, etc, all the way to the finest mineral sand (size "n") 215, desired.

Figure 6:
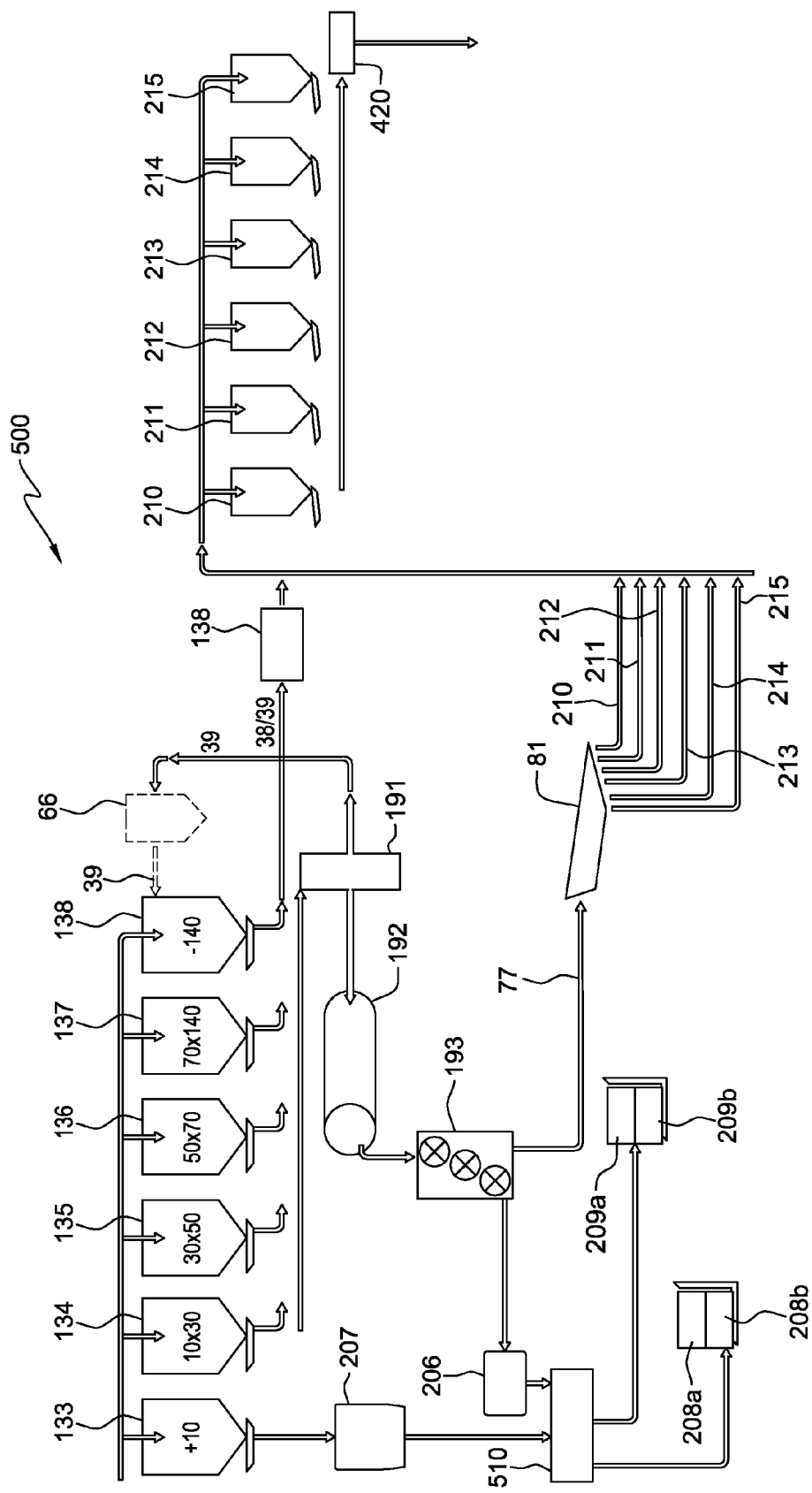
FIG. 6 illustrates optional additional processing steps that may occur within the scope of the present invention after, or concurrently with, the processes shown in FIGS. 2-4.

Referring to FIG. 6, one of ordinary skill in the art will recognize that, in yet another embodiment, an aspirator/de-duster 191, dryer 192, and a means for separating conductive metal particles 193, shown as a high-tension separator (HTS), can be employed as part of secondary processing 500 to generate specific product streams. For example, the addition of the aspirator/de-duster 191 allows for removal of ultra-fine ash product streams 39, which in combination with dryer 192 facilitates the effectiveness of the addition of the HTS (instead of ECS 190) which creates at least one fine nonferrous metal Zorba product 206 and ash stream 77.

Figure 7:
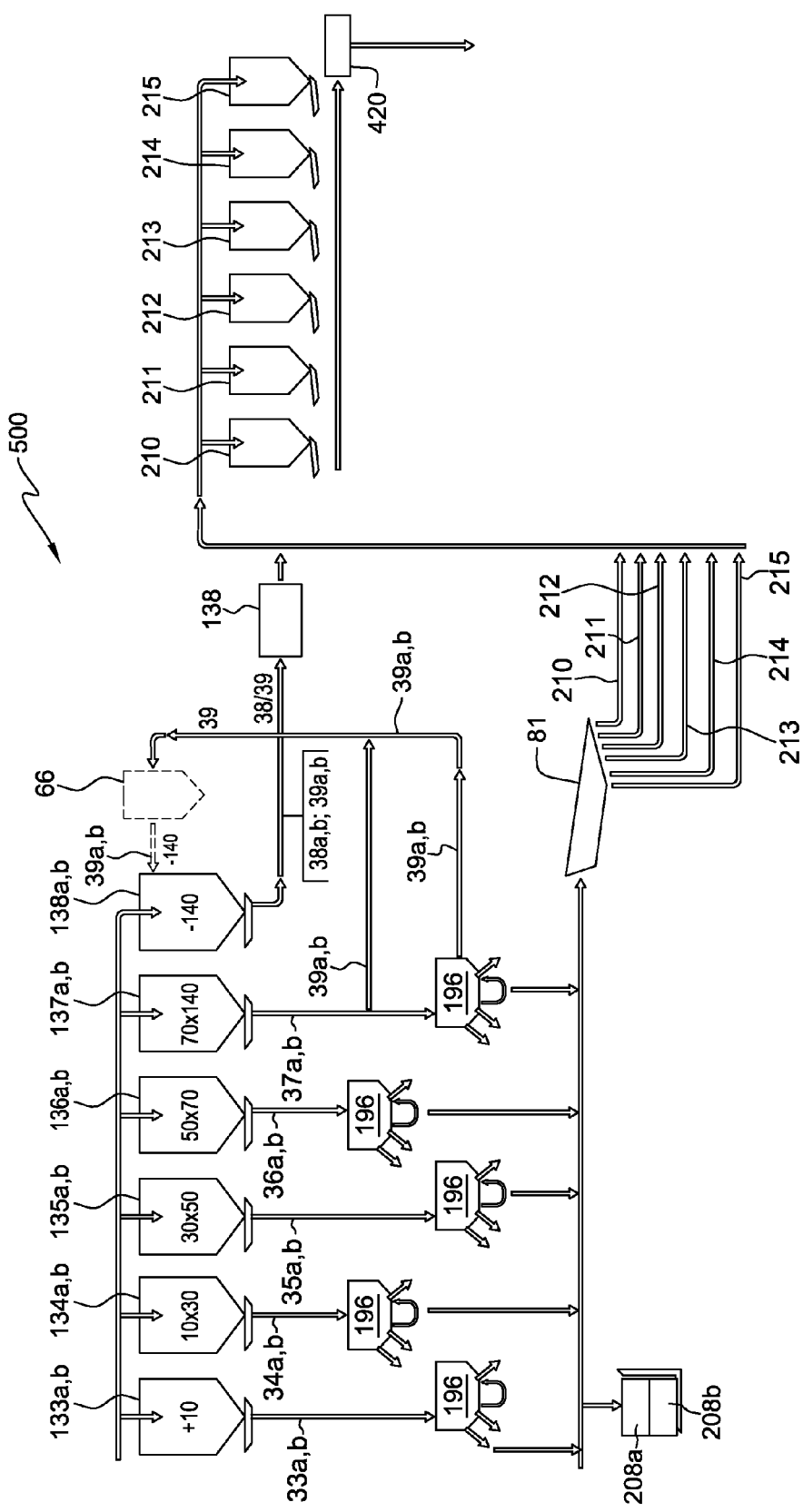
FIG. 7 shows optional additional processing steps that may occur within the scope of the present invention after, or concurrently with, the processes shown in FIGS. 2-4.

Referring to FIG. 7, one of ordinary skill in the art will recognize that, in other embodiments, size-specific air tables 196 can be employed as part of secondary processing 500 to generate specific product streams, wherein each of the air tables 196 receives an additional input of fluidizing air, pushed via positive pressure, or induced via vacuum, or a combination of the two. Like the embodiment shown in FIG. 6, one additional product stream that may result from this exemplary process is bag house dust stream 39$a,b$ that can be removed before the output streams from air tables 196 enter size classifier 81 (shown here for illustration purposes only as a 5-deck sizing screen). Furthermore, in this embodiment, exemplary products that may be recoverable from the coarse (+10 mesh), mixed metal cons 133*a,b* include low (or light) specific gravity (SG) nonferrous metal concentrate products ("cons") 208*a*, such as aluminum cons, and high (or heavy) SG nonferrous metal concentrate products ("cons"), such as copper, brass, lead, zinc, etc. cons 208*b*.

Figure 8:
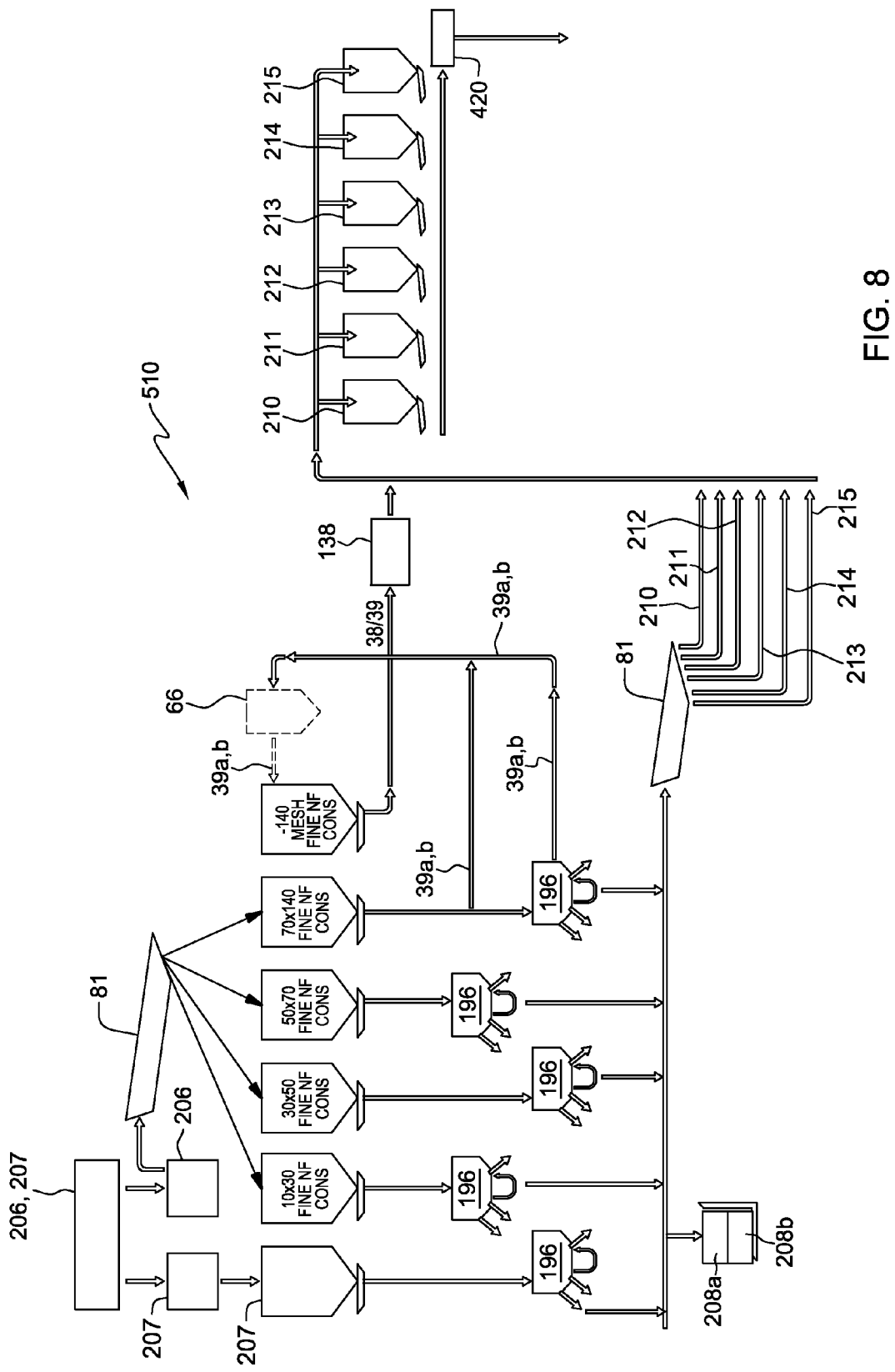
FIG. 8 depicts optional additional processing steps that may occur within the scope of the present invention after, or concurrently with, the processes shown in FIGS. 2-4.

FIG. 8 shows an example of secondary separation process 510 (see FIGS. 6 & 7). As can be seen, although the embodiment shown in FIG. 8 is similar to the one illustrated in FIG. 7, the input material is the HTS or ECS-produced mixed cons products 206/207 generated from the secondary processes 500 of FIGS. 5 and 6. In the embodiment shown here, the fine non-ferrous cons 206 shown in FIG. 6 are sorted, or classified, via size classifier 81 (for example, with a 5-deck sizing screen) both before and after being processed through air tables 196 to produce high-grade, mineral sands 210-215. FIG. 8 also shows that the coarse nonferrous input 207 may bypass sorting size classifier 81 and proceed directly to alternative processing, such as via air table 196, to produce low SG nonferrous metal cons 208*a* and high SG nonferrous metal cons 208*b*.

Figure 9:
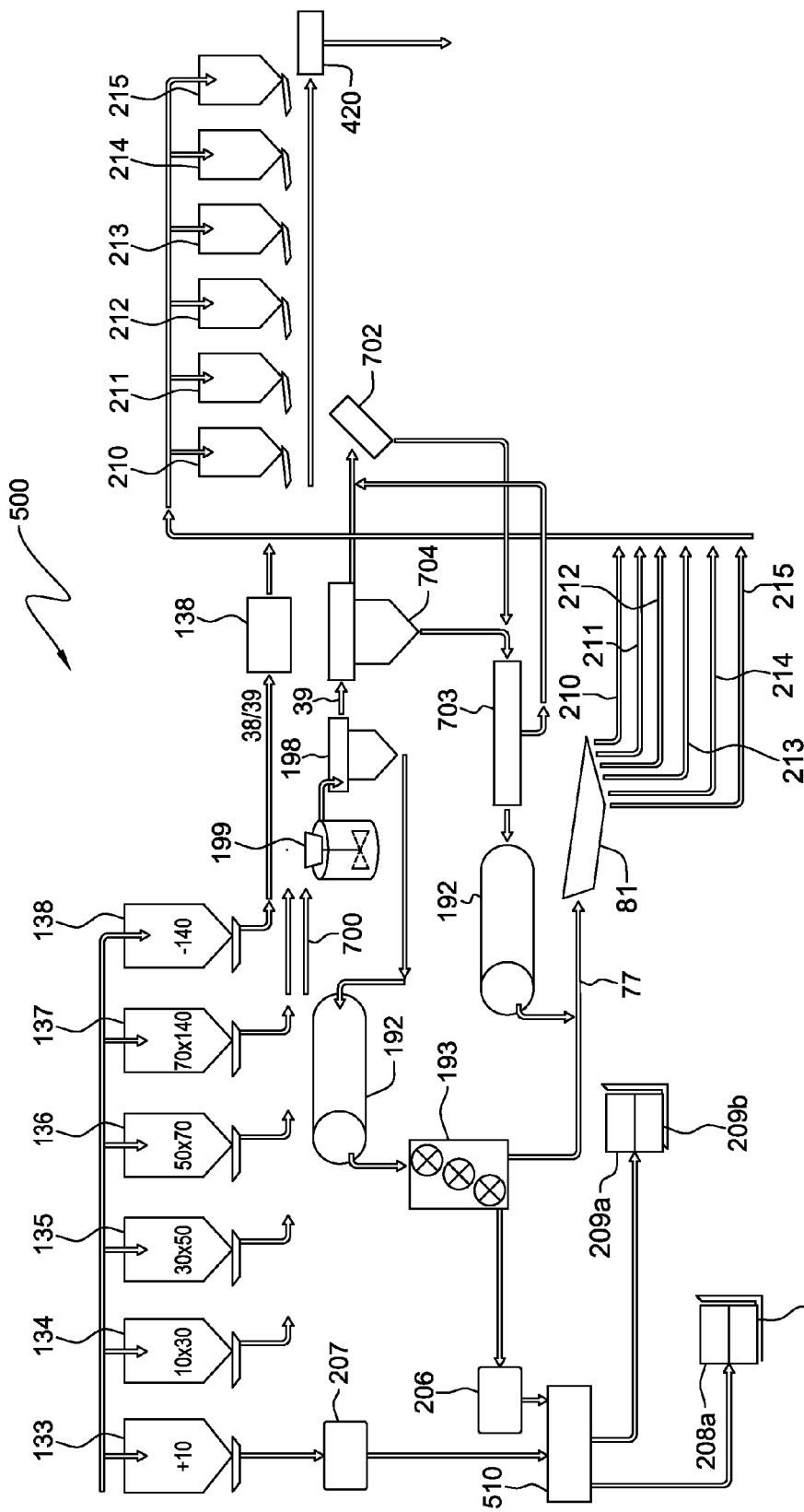
FIG. 9 shows optional additional processing steps that may occur within the scope of the present invention after, or concurrently with, the processes shown in FIGS. 2-4.

Although most of the embodiments of the invention disclosed herein include examples that incorporate dry processes, wet processes may be appropriate as well. For example, and referring to FIG. 9, in yet another embodiment within the scope of the invention, alternative wet processes similar to those shown in FIG. 6 are utilized as part of secondary processing 500. An additional metered, aqueous processing stream 700 is illustrated in FIG. 9 together with a portion, or all, of the ash streams 133-138 (also metered). The metered ash streams proceed into an attrition scrubber 199 along with the aqueous stream, for example water. The specific amounts of each metered input stream (i.e. ash stream and/or water stream) will vary, depending on the desired intermediate (for example, a slurry containing 60% solid product). This desired intermediate can then proceed through a means for gravity-based separation 198, such as a hindered settling gravity separator. As will be recognized by one of ordinary skill in the art, additional inputs can be made at or before this step in order to create the desired product. This product may then proceed through additional processing, such as filtration 703, drying (see 192), thickening 704, HTS separation 193 or other separating process such as air tabling etc, and/or clarification 702, and then either screened according to size via size classifier 81 or pulled from the processing stream entirely for sale or other processing.

EXAMPLE

A hypothetical example of one method according to the present invention will be described below, along with factors and considerations that may be applicable at a particular step in the process according to one or more aspects of the invention. For the purposes of this non-limiting example, ash 55 comprises bottom ash only which is then processed through a series of steps as shown in FIG. 10. In this example, several processes according to the present invention are described. It should be noted, however, that generation of any particular product stream identified herein could be an endpoint of the processes of the present invention and ash 55 could be provided via any of the methods described above or as otherwise known in the art, all of which are contemplated as within the scope of the present invention.

In this example, ash 55 is first scalped in a first filtration step 90 to remove any large over-size nonmetallic clinkers or metallic objects (i.e. "large cut") that might damage down-stream equipment. As used herein, clinker is defined to include, generally, a byproduct of the WTE process that forms a heavy, typically glassy, agglomerate consisting of ash, slag, grit, or other waste materials. In this first filtration step, the removal of oversized objects is accomplished by using "grizzly" scalping machine (B) as a filtering mechanism 47. In this example, the over-size objects removed by grizzly scalping machine B are sent off-line via oversize process stream 9 to an over-size bin processing unit (C) that can break-down the oversize objects, for example with a skid-steer or track-hoe-mounted hydraulic jack-hammer. After size reduction in bin processing unit C, these materials can be reintroduced as starting feed material as process stream 9*b*.

The grizzly scalping machine B can have multiple sizing decks. For example, in an alternate embodiment (not shown), a robust perforated plate is used as a lower deck to scalp out any of the finer under-sized materials (i.e. "fine cut") that can be rerouted to by-pass crushing mechanism 50 (i.e., primary comminution 100), shown in FIG. 10 as primary crusher (E). These finer materials (of any designated, advantageous size, e.g. <¼ inch) can be by-passed around the primary crusher (E) so as to reduce crusher load and crusher component wear, or the fines can be maintained within the process stream directed through the primary crusher (E), so as to gain additional impact size reduction for additional liberation of phases contained in those pieces.

As part of first filtration step 90, the middle cut (with or without the fine cut, as preferred) is then directed to the coin extraction device (D) that removes liberated coins, thereby producing coin product 111, prior to passing through the primary crusher (E) to ensure a minimum of damage to coins 111 that are already sufficiently liberated and can be extracted prior to crushing. In practice, the coins drop down to a secondary deck with holes slightly smaller than a dime (or the smallest coin to be extracted). Preferably, any fine ash or fine metal particles smaller than a dime (or other designated size) fall through the holes in this second deck and are then conveyed as by-pass around the primary crusher or conveyed into the primary crusher as feed, as preferred by the operator. Highly concentrated coins with very little remnant ash are then captured from this second deck and harvested, or extracted, as a valuable coin product stream 11. The coins 111 are then subsequently cleaned, polished, and classified/sized. The remnant large-size cuts exit from the coin extractor as ash stream 12).

In the next step, primary comminution 100, ash stream 12 is conveyed into primary crusher (E) for primary size reduction and initial liberation of metals entrapped therein. The crusher (E) should be adjustable to be able to have control over the preferred size range exiting the crusher in comminuted ash stream 14. The comminuted ash 14 from the primary crusher (E) is then processed via separation step 200, wherein large magnetic materials that could damage the secondary mill (H) are removed by a magnetic separator (F) to yield ferromagnetic product 115 and produce first refined ash 116. The ferromagnetic products 115 ultimately become a part of the ferromagnetic metal scrap end-products that are produced in accordance with the embodiments of the invention. Next, in a second filtration step 91, first refined ash stream 16 is passed over a second scalping mechanism (G) to remove any oversize material too large for the secondary mill (H), thereby creating filtered refined ash stream 18. The oversize materials are recycled back to the primary crusher (E) as oversized refined ash stream 17 for additional size reduction and liberation. Although not shown, the material in refined ash stream 16 can also undergo an optional second coin extraction as part of the scalping operation (G) by adding additional decks to the scalping screen (G) for the purpose of removing any coins further liberated during primary crushing. The scalped and (optionally) de-coined filtered refined ash stream 18 is then introduced to a secondary comminution step 101 in secondary mill (H). During this process step, the ash stream is subjected to intense milling to achieve a substantially reduced particle size and substantially complete liberation of any remaining metals in the ash. More specifically, a substantially reduced particle size comprises substantial portions of ash with a particle size less than about 2 mm, preferably less than about 1 mm, and even more preferably, consists of substantial portions below about 0.1 mm. Although one of ordinary skill in the art would recognize that there are several commercially available milling mechanisms that can be used for this step, as shown herein, secondary mill (H) is a 4-row cage mill wherein the particle size distribution, degree of liberation, and proportion of very fine ash is regulated by control of the rotational speed, or revolutions per minute, of the cages.

As shown in FIG. 10, the finely milled, comminuted refined ash stream 20 exiting from the secondary mill (H) can be processed in an optional dryer (J). One of ordinary skill in the art will recognize that the optional dryer also has the option of varying its location in the process. It may be at the very front end before the primary mill, or at some other advantageous position. The resulting ash stream is then processed via a third filtration step 92, wherein a wire scalping operation (K) is used to remove the bulk of wire 123 prior to classification step 250.

Ash stream 24, which emerges from wire scalper K, is then classified into multiple size cuts via size classifier 81a in classification step 250, which can be any mechanical screening system known in the art, for example a 5-deck screen, for flexibility and high capacity. Depending on the required through-put capacity, the ash stream can be size classified via one or more screening mechanisms operating in parallel to separate the finest particles (i.e. −70 mesh or −140 mesh) and to optimize the number and size range of the remaining size cuts for subsequent processing according to the designated production rate and source material at that location in accordance with conventional technologies known to those skilled in the art. In this example, the selected finest particles of the milled ash are separated as stream 25n and taken directly to product silos to be combined with the finest ash product fractions 38. Furthermore, fine ash dust (e.g., −140 mesh) from primary crusher E, secondary mill H, and optional dryer J (represented as Streams 13, 19, & 21) that has been picked up via process air can be harvested as bag house dust 39, sent though bag house system 66, and then combined with the finest ash product streams 38/25n and stored in a product silo as mineral sand 138. In still other embodiments, the finer undersize fractions, designated in FIG. 2 as streams 25n (i.e. −70 mesh or −140 mesh), are processed in parallel with the larger cut sizes rather than being sent directly to product silos.

The remnant coarser portion of main process stream 25 is split into two or more approximately equal streams to facilitate enhanced removal of magnetic materials higher in iron, such as ferrous metals and magnetic minerals. In classification step 250, depending on the designated production rate, source material and desired end-products, multiple streams are contemplated as within the scope of the invention and the separation of the remnant coarser portion of the main process stream 25 is accomplished using a size classifier 81a. The split points and stream sizes for the two or more streams can be advantageously determined by one skilled in the art depending on the composition and particle size distribution of the source material. For example, one skilled in the art could select the appropriate size cut ranges to use that would produce nearly equal stream sizes, with the exception that a slightly larger portion may preferably be directed onto the coarser screen decks for efficiency in cut performance.

In separation step 201, each of streams 25a,b . . . are then conveyed through a dedicated multi-phase magnetic separation system 80 that is tuned specifically for each particular size cut range, preferably incorporating a progression of magnetic separations from low magnetic field strength to higher field strength to progressively remove a series of iron-bearing products (highly ferromagnetic, highly paramagnetic, and then lowly paramagnetic phases) that are segregated according to iron concentration. In this embodiment, multi-phase magnetic separation system 80 is represented by unit operations N1,N2 . . . ; O1,O2 . . . ; P1,P2 . . . . In accordance with the invention, the dedicated multi-phase magnetic separation system 80 is tuned for specific size cut ranges, and incorporates a progression of magnetic separations from low magnetic field strength to higher field strength to progressively remove a series of iron-bearing products, which in turn facilitates a much more effective recovery and separation of ferrous products. For example, unit operations N1,N2 . . . and O1,O2 . . . could comprise a twin drum magnetic unit with magnetic field strengths of 2.6 k and 8 k Gauss, respectively, and unit operation P1,P2 . . . could be a twin RE (rare earth magnet) roll unit with a magnetic field strength of 20 k gauss. Under this example, and referring to FIG. 10, the resulting ferrous products produced by product streams 27a,b; 28a,b; and 30a,b will range from very high iron content (ferromagnetic products 127) to very low iron content (low paramagnetic products 130). In this way, embodiments of the invention provide for better recovery of ferrous products and superior quality in ferrous metal concentrates. This step of the invention also provides for greater flexibility and optimization of revenue from the ferrous metals extracted as the separated ferromagnetic and paramagnetic products 127, 128 and 130.

As one of ordinary skill in the art will be able to determine, certain product streams also can be eliminated depending on the source material, commercial market and/or the desired composition of the mineral sand end-product. For example, the production of the low paramagnetic material streams 30a,b is optional and dependent on the value and marketability of the lower iron content paramagnetic material 130 and the utility of its effect on the chemical composition, e.g. iron content, of the remnant nonmagnetic mineral ash.

Referring again to FIG. 10, after removal of the magnetic ferrous metals via multi-phase magnetic separation system 80, nonmagnetic metals (i.e. nonferrous metals and nonmagnetic stainless steel (NMSS)) and remnant ash are separated from second refined ash stream 31a,b via size classifier mechanism 81b, shown here as two five-deck sizing screens (Q1-Q2). In this step, each of the second refined ash streams 31a,b are further subdivided into streams with narrower size cut ranges (33a,b-38a,b). Although in this example, two five-deck sizing screens are depicted for the subdivision and size classification, the step can be accomplished using any conventional or known means for mechanical screening known to those skilled in the art. For example, in alternative embodiments, more than two commercially available 5-deck screens are utilized for flexibility in choosing cuts and in meeting high capacity requirements. In other embodiments, only one screen with multiple decks is all that is required.

The bulk of the nonferrous metal and NMSS concentrates 133a,b are produced from the coarsest streams 33a,b. For example, coarser cuts above about +10 mesh would produce a highly concentrated, mixed nonferrous metal concentrate, typically a Zorba 90, i.e. with greater than 90% metal concentrate, while a −8×+10 mesh cut would produce a slightly lower grade Zorba, typically around a Zorba 70-80. In accordance with the invention, the composition of the mixed nonferrous Zorba will be made up of a number of metals. More specifically, a typical example of the composition of mixed metal cons 133a,b would be about 50-60% aluminum, about 25-30% copper and brass, about 4% zinc & lead, about 7% stainless steel, about 0.1-0.2% precious metals and about 10% remaining nonmetallic mineral ash. As one of ordinary skill in the art can appreciate, the actual amounts and compositions of the Zorba product will depend on the source stream of ash processed and the steps used to practice the invention. In the case of the 8×10 mesh Zorba 70-80 (M2a,b), this concentrate can be upgraded to a Zorba 90 by subjecting stream 34a,b to a second pass through the secondary mill (H). Additional examples of optional cut sizes for the mixed nonferrous metal concentrates and NMSS are +¾", −¾×+4 mesh, −4×+6 mesh, and −6×+8 mesh.

The mixed nonferrous Zorba products can be sold into the marketplace as is (mixed nonferrous), or be subjected to secondary processing 500 to further separate and segregate the metals contained therein, as shown generally in FIG. 10 and more specifically in FIGS. 5-9. Although not required, additional secondary processing 500 will allow one to produce higher value product streams 40a, 40b, 41a, and 41b from the nonferrous metal concentrates by further separating the mixed metals. An initial degree of separation of these metals results in segregation of "light nonferrous" from the "heavy nonferrous" metals; typically separation of aluminum, and possibly with some magnesium, from copper, brass, zinc, lead, precious metals, and nonmagnetic stainless steel. In certain embodiments of the invention, secondary processing of nonferrous materials that have been subdivided and size classified into different streams, each with its own size cut range, can be used to locate and extract precious metals, such as gold and silver. These more valuable precious metals tend to have the highest specific gravity of any material in a given size cut. This process facilitates a higher probability of finding and extracting these precious metals relative to conventional processes.

The efficiency of secondary processing 500 is provided for by maintaining and processing the narrower size cuts in parallel processing operations, each tuned specifically for a particular size range. For secondary processing 500, dry processes, wet processes and combined dry and wet processes can be used to separate the mixed nonferrous Zorba size-cuts into "light nonferrous" aluminum and "heavy nonferrous" copper, brass, zinc, lead, precious metal, stainless concentrates, represented in FIG. 10 by product streams 40a, 40b, 41a, and 41b. By way of example, one method of separating various nonferrous metals is based on differences in specific gravity of the different metals. Examples of other separation processes that can be used to segregate the different metals include wet tabling, air tabling, wet spiral classifier circuits, jigging, and upflow-hindered-bed settling, and hydrosizer processes. Where appropriate and effective, dry processing is preferred since it generally has a lower capital cost and a lower cost of operation.

The mineral ash cuts represented in this example by streams 34-39 can also be subjected to secondary processing 500, resulting in mineral sand stream 42a,b and mineral sand products 142, as shown generally in FIG. 10 and more specifically in FIGS. 5-9. The same separation processes described above can also be applied to the mineral ash cuts to further reduce metals remaining in the mineral sand product, producing a cleaner mineral sand product plus additional metals recovery and revenue. As an example, the −10×+30 mesh cut, the −30×+50 mesh cut, and the −50×+70 mesh cuts can be further "cleaned" by fluid-bed tabling operations with effective removal of additional mixed nonferrous metals from those ash cuts. In still other embodiments, the mineral ash cuts will only comprise, for example, streams 35-39, or alternatively streams 36-39, with streams 33-34 and 33-35 (respectively) comprising metal concentrates of varying size cuts.

The table below represents data from a pilot test conducted in accordance with the invention described herein. In this embodiment, the process described and claimed herein was applied after conventional pre-processing had already occurred at the WTE plant. In other words, significant amounts of metal concentrates (with about 70% metal content) had already been removed from the source ash prior to applying the recycling process described and claimed herein (see Table I). It was then intended for this source ash to be disposed of in a landfill or other means in accordance with conventional practices. Despite prior removal of both ferrous and nonferrous metals, the data below (see Table II) exemplifies that the process described herein is able to liberate and extract a relatively substantial amount of additional nonferrous and ferrous metals and that the additional metal concentrates produced are of a higher quality/grade (about 90% metal content).

TABLE I

Metal Concentrate Removed by Conventional Process From Source Ash Prior to Pilot Test

|  | @ Actual 70% Metal Concentration Basis | | | @ 100% Metal Basis |
| --- | --- | --- | --- | --- |
|  | % of MSW | % of RDF | % of BA | % of BA @ 100% |
| Total Ferrous, Pre + Post Combustion Removed | 3.49% | 5.17% | | |
| Precombustion Ferrous | 3.16% | 4.70% | | |
| Post Combustion Ferrous | 0.33% | 0.47% | 3.95% | 2.76% |
| Total Non-Ferrous | 0.51% | 0.76% | | |
| Pre-combustion Nonferrous | 0.25% | 0.37% | | |
| Post-Combustion Nonferrous | 0.26% | 0.39% | 3.30% | 2.31% |

TABLE II

Additional Metal Concentrate Extracted During Pilot Test

|  | @ Actual 90% Metal Concentration Basis | | | @ 100% Metal Basis |
| --- | --- | --- | --- | --- |
|  | % of MSW | % of RDF | % of BA | % of BA @ 100% |
| Post-Combustion Ferrous | 1.20% | 1.77% | 14.89% | 13.41% |
| High Ferromagnetic | 0.36% | 0.53% | 4.49% | 4.04% |
| High Paramagnetic | 0.24% | 0.36% | 3.01% | 2.71% |
| Low Paramagnetic | 0.60% | 0.88% | 7.39% | 6.65% |
| Post-Combustion Nonferrous | 0.32% | 0.48% | 4.02% | 3.62% |

These results are a direct demonstration of the advanced capability of the process described herein. More specifically, the ability of this process to extract a higher percentage of metals from ash relative to conventional processes is directly demonstrated by the fact that the starting feed material used in the above experiments was WTE ash from a highly advanced conventional ash processing operation (i.e. metal was removed from the MSW at the municipal recycling facilities prior to arrival at the WTE plant, the MSW was shred at the WTE to produce refuse derived fuel (RDF), metal was removed from the RDF at the WTE plant prior to combustion, and the WTE removed additional metals from the ash after burning the RDF using post-combustion processes). The starting feed material used had already been processed through magnetic separators and nonferrous eddy current separators two times, both before and after the combustion process. Even with this twice-over pre-processing removal of ferrous and nonferrous metals, the process of this invention extracted a relatively large additional volume of ferrous and nonferrous metals that had been missed and were being sent to the landfill.

One of ordinary skill in the art will recognize that in cases where there is no pre-processing or only limited pre-processing of the source ash (i.e. no removal from the MSW of metals at the municipal recycling facilities, no pre-combustion extraction of metals at the WTE or incinerator plant, use of mass burning mode rather than RDF, and/or no metal extraction from the ash after combustion), the highest amount of metal available for extraction by the process described herein would necessarily be left and would result in a higher percent removal as compared to those circumstances wherein the least amount of metal remains in the source ash to be extracted due to prior processing efforts (i.e. removal of metal from the MSW at the municipal recycling facilities prior to arrival at the WTE, shredding of the MSW at the WTE to produce refuse derived fuel (RDF), pre-combustion removal of metals from the RDF at the WTE, and/or post-combustion removal of metals from the ash).

It is noted that the above embodiments have been shown with respect to a limited number of processing steps and without any of the ancillary steps and apparatus that necessarily take place within a comprehensive recycling process/plant. However, the concept of the present invention is not limited to a set number of screening, comminution and separation steps or to the mechanisms and apparatus disclosed herein. Nor is it limited to a certain order of steps. Furthermore, it should be expressly understood that any desired number of primary and secondary processes or mechanisms could be employed in series or in parallel, and that the selection of the screening mechanisms, separation mechanisms, comminution mechanisms and other ancillary processes are within the discretion of the skilled artisan to meet the needs of the particular source material, desired end-product and budgetary restrictions, just to name a few.

For example, although the examples contained herein contain a separation step 200/201 that utilize a magnetic field following both primary comminution 100 and secondary comminution 101, one of ordinary skill in the art will appreciate that a magnetic separation step could take place at any stage in the recovery process. By way of example only, one could have a series of comminution steps (or even just one, if the desired particle size can be achieved), followed by one or more non-magnetic separation steps (i.e. mechanical screening, to achieve a concentrated, mixed nonferrous and ferrous product, without any prior magnetic separation. Once the mixed nonferrous and ferrous products have been recovered, magnetic separation could then be employed to separate and produce high-quality nonferrous products and ferrous products.

TABLE III

Maximum Concentration of Contaminants for Toxicity Characteristic Leaching Procedure (Metals/Metalloids Only)

| Contaminant | Regulatory Level (mg/l) |
| --- | --- |
| Arsenic (As) | 5.0 |
| Barium (Ba) | 100.0 |
| Cadmium (Cd) | 1.0 |
| Chromium (Cr) | 5.0 |
| Lead (Pb) | 5.0 |
| Mercury (Hg) | 0.2 |
| Silver (Ag) | 5.0 |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art to accomplish the same objectives. Accordingly, it is intended by the appended claims to cover all such alternative aspects as fall within the true spirit and scope of the invention

The invention claimed is:

1. A method for recovering metals from combustion ash, comprising the following steps in series:
   a. providing a feedstock source of ash;
   b. performing a comminution step by introducing said ash to high impact and low shear conditions to substantially liberate metal particles entrapped therein and produce comminuted ash, wherein the comminuted ash comprises nonmetal particles with a particle size less than about 2 mm, and said metal particles comprise relatively ferrous particles and relatively nonferrous particles;
   c. processing the comminuted ash with at least one dry separation method based on particle size to produce a minimum of three streams of varying particle sizes, wherein at least one of the three streams is a refined ash stream with a reduced metal content and at least one of the three streams is a substantially metal particle stream;
   d. separating a portion of the relatively ferrous particles from the at least one substantially metal particle stream by applying at least one magnetic field to selectively remove magnetic particles and produce at least one ferrous metal product; and
   e. separating a portion of the relatively nonferrous particles from at least one of the three streams to produce at least one nonferrous metal product with a nonferrous metal content of greater than 70%.

2. The method of claim 1 further comprising the additional step of producing a mineral sand product from the refined ash with a substantially nonmetallic content.

3. The method of claim 1, wherein substantially all of the nonmetal particles in the comminuted ash have a particle size of less than about 1 mm.

4. The method of claim 1, wherein the method further comprises the step of drying.

5. The method of claim 1, wherein step (b) comprises a primary comminution step and a secondary comminution step, said steps performed in series.

6. The method of claim 5 wherein said primary comminution step is performed using a crusher and said secondary comminution step is performed using a high impact milling or crushing machine.

7. The method of claim 1 wherein step (d) is performed using at least one magnetic separator calibrated for a specific particle size range, and the at least one magnetic field comprises multiple magnetic fields of varying intensities to produce more than one ferrous metal product classified by varying degrees of ferrous content.

8. The method of claim 7 wherein the more than one ferrous metal product is selected from the group consisting of ferromagnetic metal products, highly paramagnetic metal products, lowly paramagnetic metal products, ferrimagnetic products and combinations thereof.

9. The method of claim 1 wherein the ash is processed by at least one additional treatment process prior to comminution selected from the group consisting of warm quenching, ph control, filtration, mechanical screening, pneumatic aspiration, extraction, scalping, drying, and combinations thereof.

10. The method of claim 5 wherein materials or particles that are not suitable for comminution are removed prior to the primary comminution step, prior to the secondary comminution step, or prior to the primary and secondary comminution steps.

11. The method of claim 10 wherein the materials or particles that are not suitable for comminution are selected from the group consisting of coarse aggregates, oversize materials, metal coins, wire, fine ash product and combinations thereof.

12. The method of claim 10 wherein the materials or particles that are not suitable for comminution are removed by using a process selected from the group consisting of filtration, mechanical screening, pneumatic aspiration, extraction, scalping and combinations thereof.

13. The method of claim 1 further comprising processing the nonferrous particles by at least one secondary processing step to separate nonferrous metal concentrate products with a high specific gravity from nonferrous metal concentrate products with a low specific gravity.

14. The method of claim 13 wherein the at least one least one secondary processing step is selected from the group consisting of mineralogical phase separation, specific gravity separation, particle size separation, particle shape separation, electrostatic separation, magnetic separation, and combinations thereof.

15. The method of claim 1 wherein at least one metal nonferrous product has a nonferrous metal content of about 90%.

16. The method of claim 2 wherein the additional step is at least one secondary processing step selected from the group consisting of filtration, magnetic separation, electrostatic separation, specific gravity-based separation, particle size-based classification, screening, drying, thickening, clarification, floatation, and combinations thereof.

17. The method of claim 1 wherein the feedstock source is selected from the group consisting of pre-processed ash, landfilled ash, bottom ash from a solid waste incinerator or waste-to-energy plant, combined ash from a solid waste incinerator or waste-to-energy plant, and combinations thereof.

18. A method for recovering metals from combustion ash comprising:
   a. providing a feedstock source of ash;
   b. subjecting the ash to a primary comminution step and a separate secondary comminution step, said steps performed in series to produce comminuted ash and reduce the particle size of substantially all nonmetal particles contained within said comminuted ash to less than about 2 mm and substantially liberate metal particles entrapped therein, the metal particles comprising relatively ferrous particles and relatively nonferrous particles;
   c. performing a classification step, wherein the comminuted ash is classified into three or more streams of varying particle size cuts using a mechanical screening system, wherein at least one stream comprises a particle size cut equivalent to a minimum of about −10 mesh;
   d. applying a multi-phase magnetic separation system to at least one of the streams of varying particle size cuts, wherein said magnetic separation system is operated with a progression of higher magnetic field strengths to progressively remove a series of magnetic particles with decreasing ferrous content thereby producing at least one ferrous metal product; and
   e. performing at least one separation method based on particle size differentiation to produce at least one metal product with a nonferrous metal content greater than about 70%.

19. The method of claim 18 wherein the at least one ferrous metal product is selected from the group consisting of ferromagnetic metal products, highly paramagnetic metal products, lowly paramagnetic metal products, ferrimagnetic products and combinations thereof.

20. The method of claim 18 wherein the at least one separation method is a dry separation method selected from the group consisting of mechanical separation and pneumatic aspiration.

21. The method of claim 18 wherein the ash is processed by at least one additional treatment process prior to comminution selected from the group consisting of warm quenching, pH control, filtration, mechanical screening, pneumatic aspiration, extraction, scalping, drying, and combinations thereof.

22. The method of claim 18 wherein materials or particles that are not suitable for comminution are removed prior to the primary comminution step, prior to the secondary comminution step, or prior to the primary and secondary comminution steps.

23. The method of claim 22 wherein the materials or particles that are not suitable for comminution are removed by using a process selected from the group consisting of filtration, mechanical screening, pneumatic aspiration, extraction, scalping and combinations thereof.

24. The method of claim 18 wherein at least one metal product has a nonferrous metal content of about 90%, and an increased recovery of high-quality nonferrous metal products relative to the nonferrous products recovered from methods wherein nonmetal particles comprise particle sizes greater than 2 mm.

25. The method of claim 18 further comprising processing the nonferrous particles by at least one secondary processing step to separate nonferrous metal concentrate products with a high specific gravity from nonferrous metal concentrate products with a low specific gravity, wherein the at least one secondary processing step is selected from the group consisting of mineralogical phase separation, specific gravity separation, particle size separation, particle shape separation, electrostatic separation, magnetic separation, and combinations thereof.

26. The method of claim 25 wherein at least one least one secondary processing step is selected from the group consisting of a wet separation process, a dry separation process and a combination thereof.

27. The method of claim 25 wherein the at least one secondary processing step is selected from the group consisting of wet tabling, air tabling, hindered-bed settling, wet spiral classifier circuits, jigging, and combinations thereof.

28. The method of claim 18 further producing at least one stream of refined ash with a reduced metal content, and further comprising at least one secondary processing step to produce at least one mineral sand product with a substantially inorganic, metallic-free composition.

29. The method of claim 28 wherein the at least one secondary processing step is selected from the group consisting of filtration, magnetic separation, electrostatic separation, specific gravity-based separation, particle size-based classification, screening, drying, thickening, clarification, floatation, and combinations thereof.

30. The method of claim 28 wherein the at least one mineral sand product comprises a maximum contaminant concentration of 5.0 mg/L Arsenic (As), 100.0 mg/L Barium (Ba), 1.0 mg/L Cadmium (Cd), 5.0 mg/L Chromium (Cr), 5.0 mg/L Lead (Pb), 0.2 mg/L Mercury (Hg), ad 5.0 mg/L Silver (Ag) in compliance with the Toxicity Characteristic Leaching Procedure.

31. The method of claim 1 wherein the nonferrous particles comprise light nonferrous metals and heavy nonferrous metals.

32. The method of claim 31 wherein the light nonferrous metals comprise aluminum or magnesium.

33. The method of claim 31 wherein the heavy nonferrous metals comprise at least one of brass, lead, cadmium, mercury, uranium, gold, silver, antimony, rare earth elements, precious metals, nonmagnetic stainless steel, metals having an atomic weight of greater than 58, or alloys.

34. The method of claim 33 wherein the heavy nonferrous metals further comprise at least one of copper, chromium, nickel or zinc.

35. The method of claim 1 wherein the nonferrous metal product comprises about 50-60% aluminum, about 25-30% copper and brass, about 4% zinc & lead, about 7% nonmagnetic stainless steel, about 0.1-0.2% precious metals and about 10% nonmetallic mineral ash.

36. The method of claim 1 wherein the at least one dry separation method based on particle size produces six streams of varying particle size cuts and said particle size cuts are selected from within a range of mesh sizes from +4 mesh to −140 mesh.

37. The method of claim 1 wherein the at least one dry separation method based on particle size produces six streams of varying screen cut intervals comprising ranges of size cuts selected from the group comprising +10 mesh, −10 mesh×+18 mesh, −18 mesh×+30 mesh, −30 mesh×+50 mesh, −50 mesh×+70 mesh, −70 mesh×+140 mesh, and −140 mesh.

38. The method of claim 1, wherein substantially all of the nonmetal particles in the comminuted ash have a particle size of less than about 0.1 mm.

39. A method according to claim 18 with an increased recovery of high-quality nonferrous and ferrous metal products relative to the ferrous and nonferrous products recovered from methods wherein nonmetal particles comprise particles sizes greater than 2 mm.

40. The method of claim 18 wherein the classification step is performed using one or more five-deck sizing screens.

41. The method of claim 18 wherein the primary and secondary comminution steps are performed by a high impact crushing or milling mechanism.

42. The method of claim 41 wherein the primary comminution step is performed using an impact crusher, and the secondary comminution step is performed using a four-row cage mill.

* * * * *